June 21, 1932.   R. L. MULLER   1,864,273
ACCOUNTING MACHINE
Filed Aug. 10, 1928   13 Sheets-Sheet 1

INVENTOR
Robert L. Muller
BY
Rector, Hibben, Davis, & Macauley
ATTORNEYS

June 21, 1932.  R. L. MULLER  1,864,273
ACCOUNTING MACHINE
Filed Aug. 10, 1928   13 Sheets-Sheet 2.

INVENTOR
Robert L. Muller
BY
Rector, Hibben, Davis, & Macauley
ATTORNEYS

June 21, 1932. R. L. MULLER 1,864,273
ACCOUNTING MACHINE
Filed Aug. 10, 1928 13 Sheets-Sheet 4

INVENTOR
Robert L. Muller
BY
Rector, Hibben, Davis & Macauley
ATTORNEYS

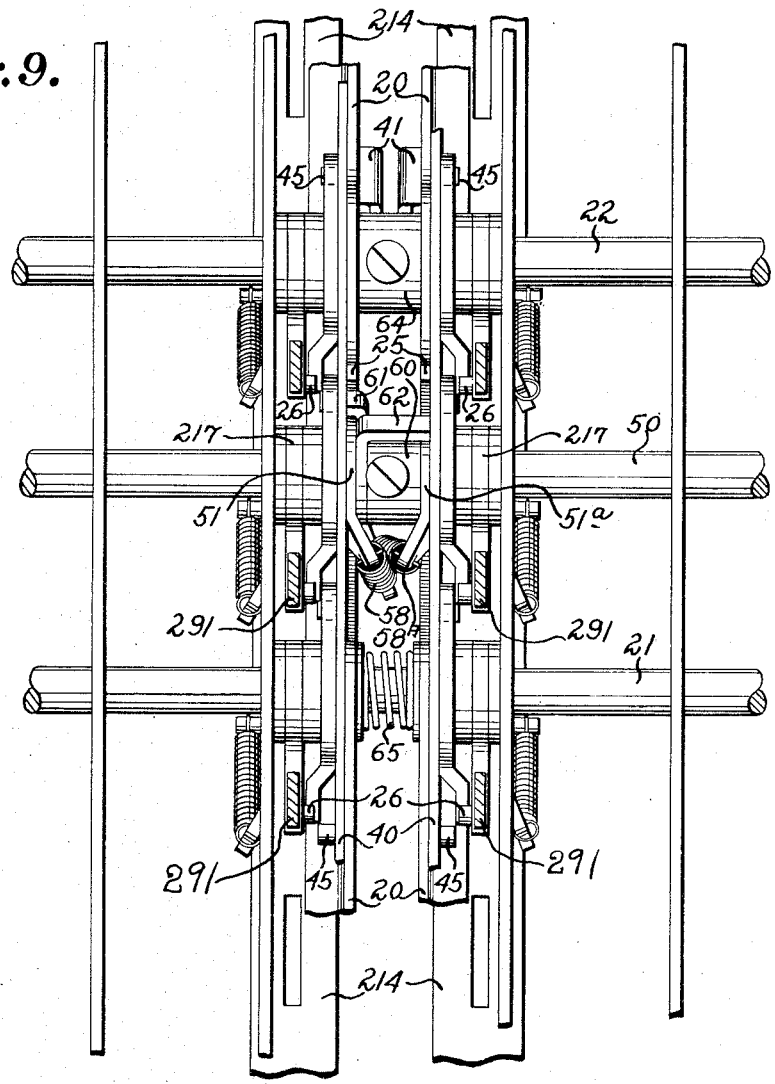

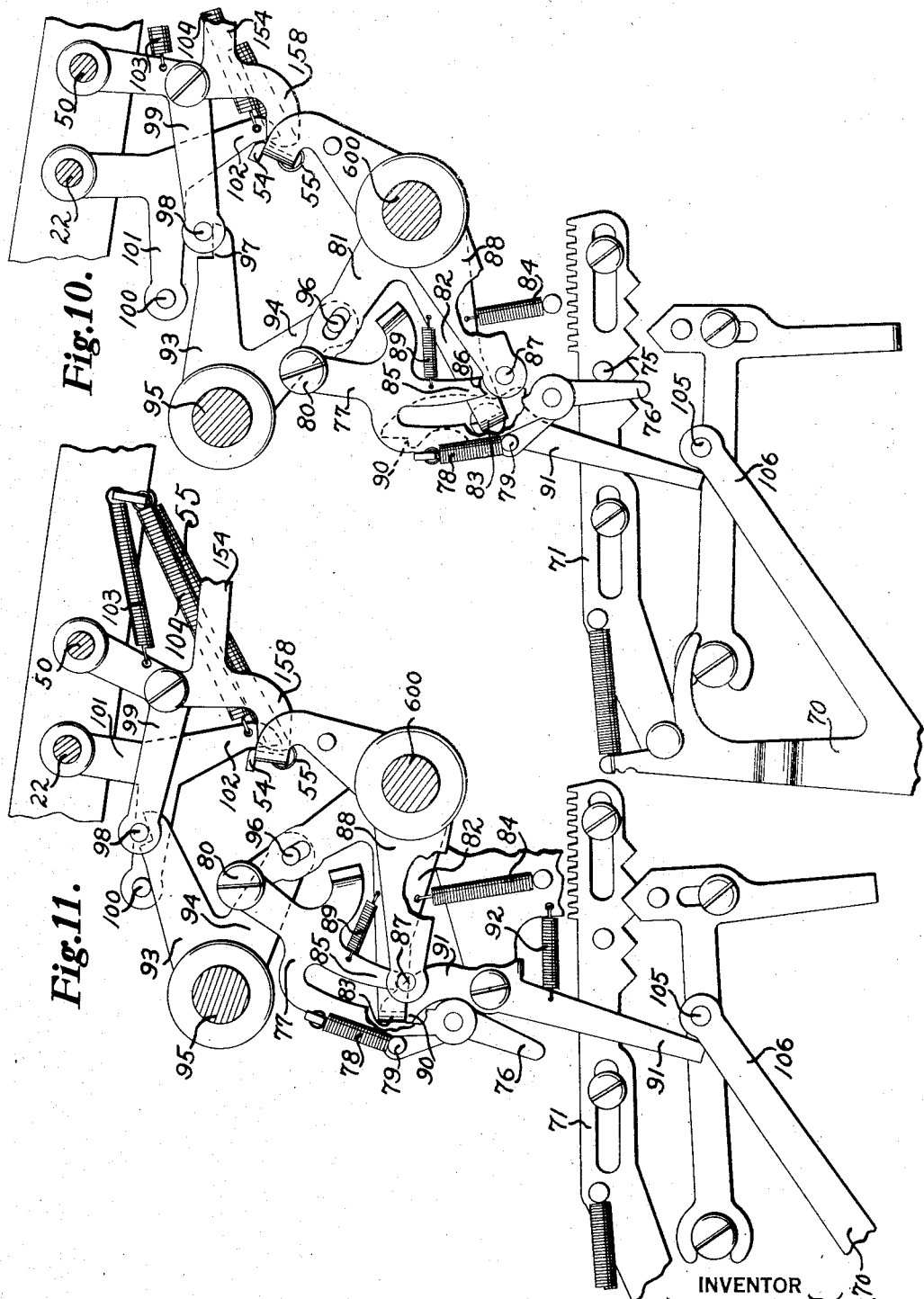

June 21, 1932. R. L. MULLER 1,864,273
ACCOUNTING MACHINE
Filed Aug. 10, 1928 13 Sheets-Sheet 8

INVENTOR
Robert L. Muller
BY
Rector, Hibben, Davis, & Macauley
ATTORNEYS

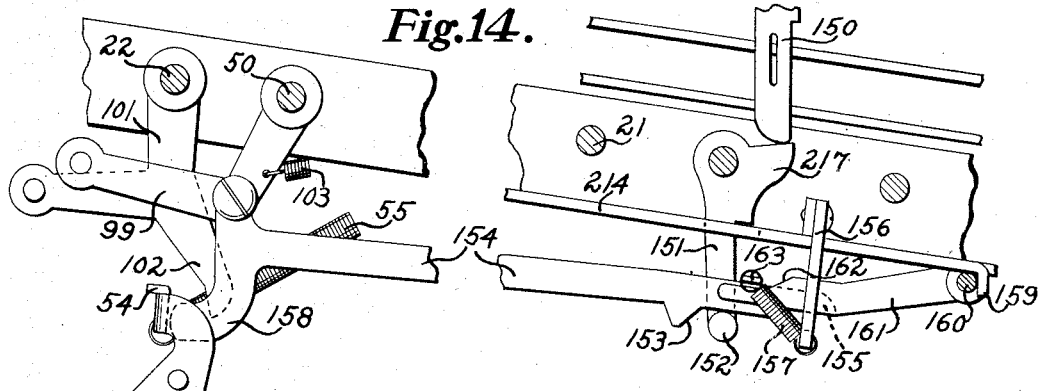
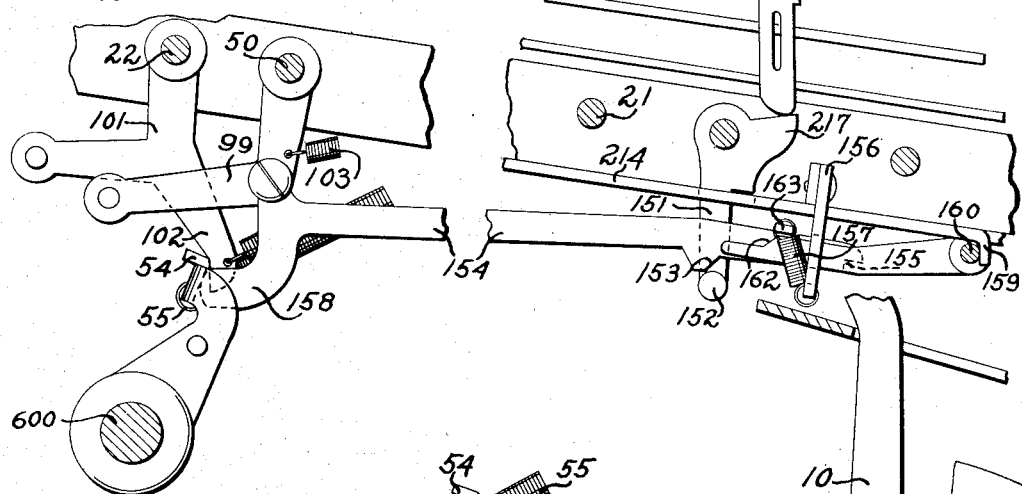
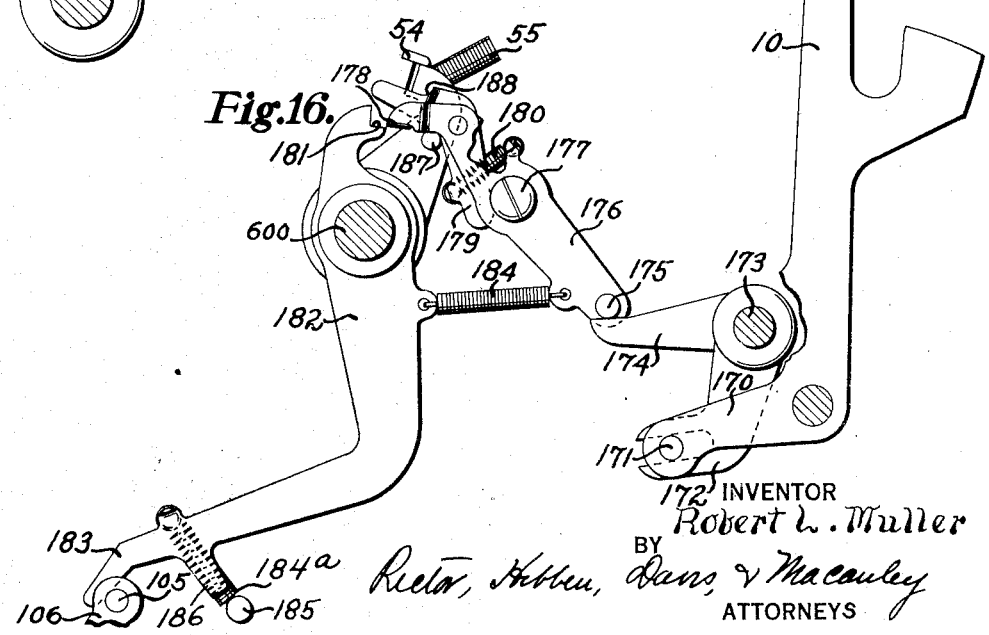

June 21, 1932.  R. L. MULLER  1,864,273
ACCOUNTING MACHINE
Filed Aug. 10, 1928   13 Sheets-Sheet 10
Fig. 17
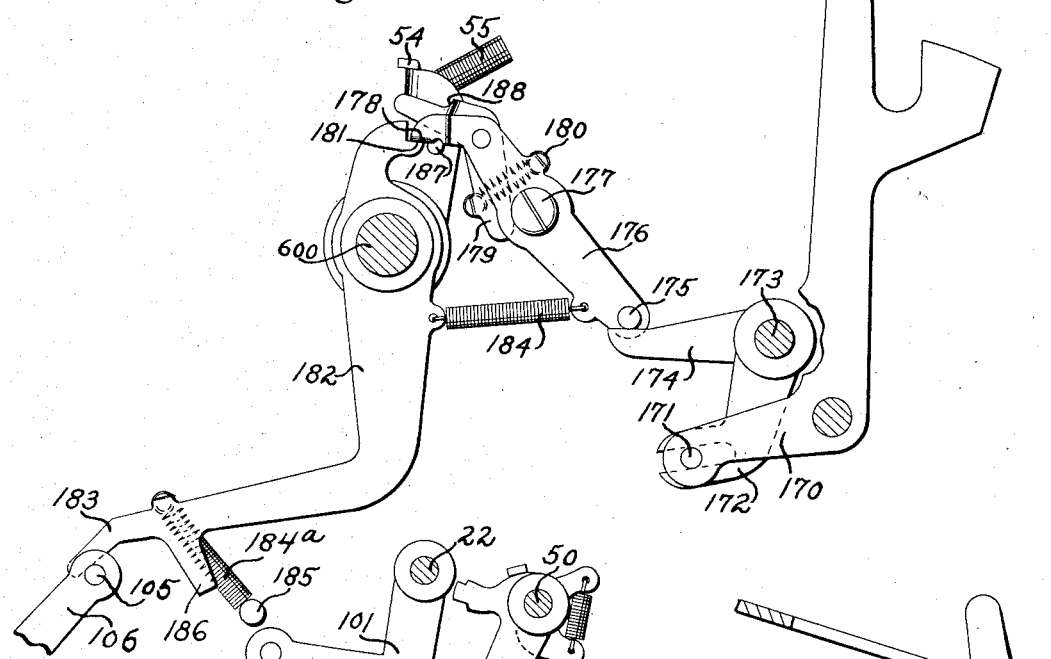
Fig. 18.
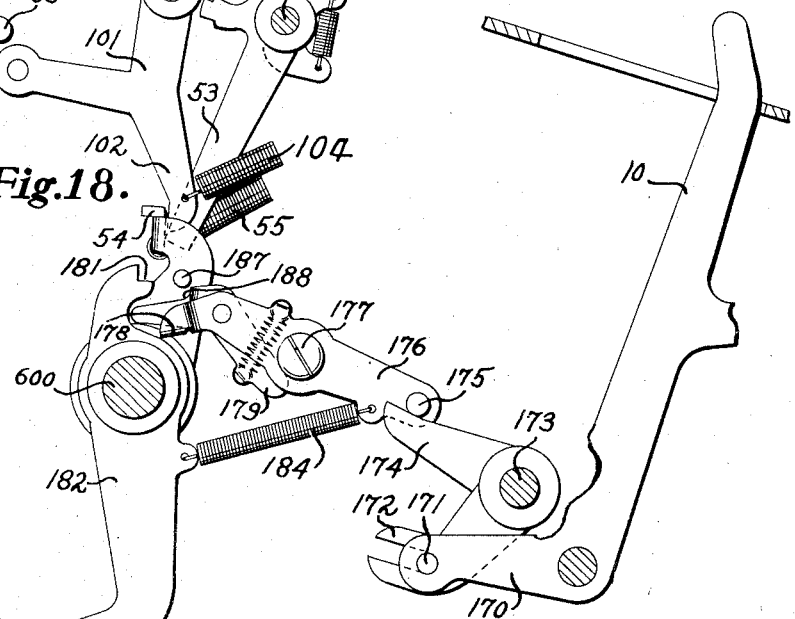
INVENTOR
Robert L. Muller
BY
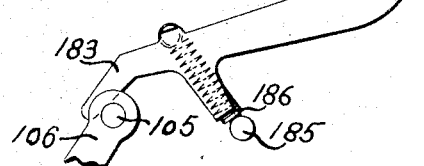
ATTORNEYS

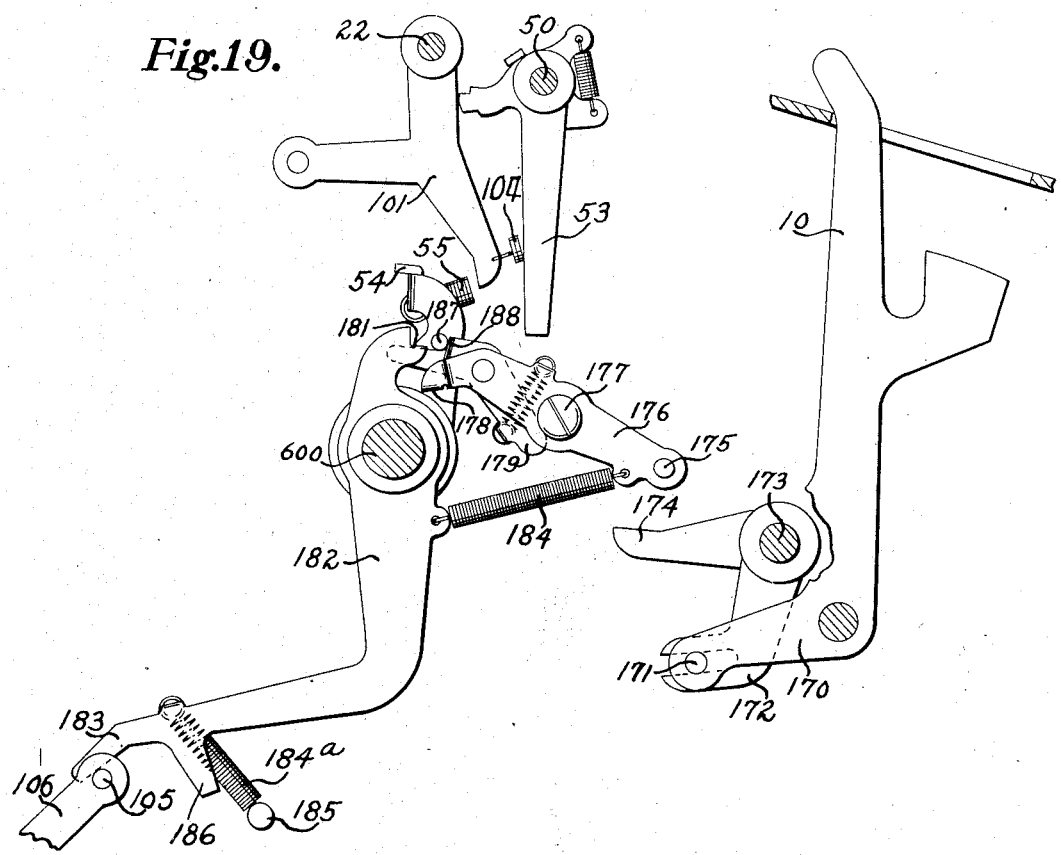
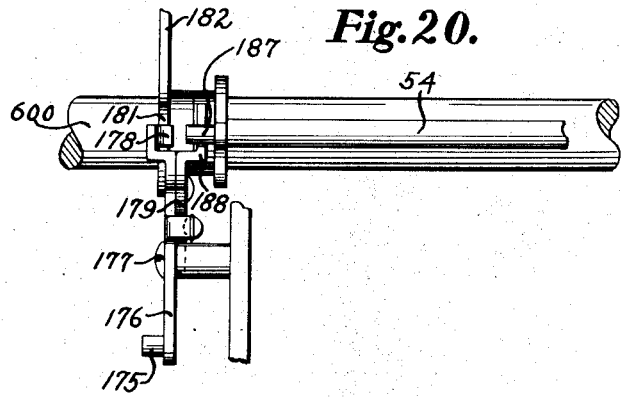

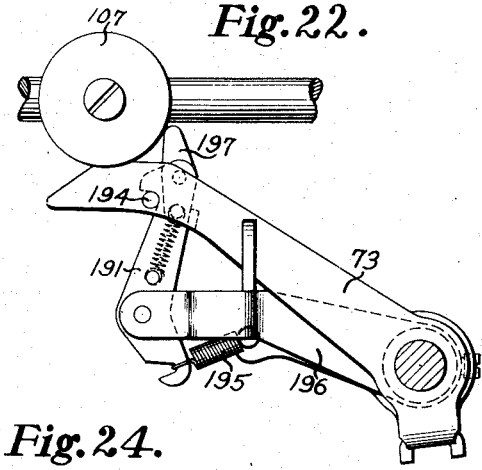
Fig. 22.
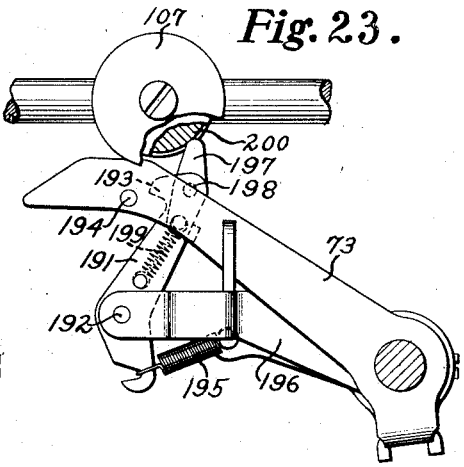
Fig. 23.
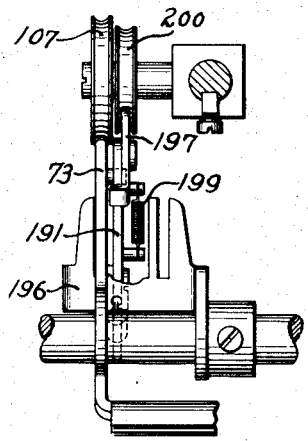
Fig. 24.
Fig. 25.
| | | TRANSACTIONS | | |
|---|---|---|---|---|
| PROOF | PICK-UP | CHARGES | CREDITS | BALANCE |
| | | | | 100.00* |
| 100.00 | 100.00 | 75.00 | 200.00- | 25.00CR |
| 25.00- | 25.00- | 100.00 | | 75.00* |
INVENTOR
Robert L. Muller
BY
Rector, Hibben, Davis & Macauley
ATTORNEYS Patented June 21, 1932

1,864,273

UNITED STATES PATENT OFFICE

ROBERT L. MULLER, OF DETROIT, MICHIGAN, ASSIGNOR TO BURROUGHS ADDING MACHINE COMPANY, OF DETROIT, MICHIGAN, A CORPORATION OF MICHIGAN

ACCOUNTING MACHINE

Application filed August 10, 1928. Serial No. 298,819.

This invention relates to an accounting machine and it is directed particularly to a construction for proving the accuracy of the work done on such a machine by preventing its operation in any other than a predetermined manner in certain columnar positions of the paper carriage.

Accounting machines are carefully constructed so as to operate accurately when properly manipulated. If an operator enters an item correctly and manipulates the machine, he may be sure that the machine will operate to give an accurate result. It is possible, however, for the operator to make a mistake in entering an item in the machine, either through misreading the item or through misoperation of the keys or levers for conditioning the machine. It is desirable therefore, to have a check on the operator's work and, in the use of a machine in commercial posting work, this check is usually made on the entry of the customer's "old balance". In order that the nature and purpose of the invention may be more easily understood, an example of work of the kind referred to, will be followed through.

It is the practice to enter and print an old balance in a column called the "pick-up" column, such balance being read from the balance column on the ledger sheet for the customer whose account is being posted. After the old balance is entered, the charges and credits against the balance are entered and printed in other columns, after which a new balance is taken from the machine and printed in a "balance" column. The carriage then automatically tabulates back to a "proof" column where the old balance is entered a second time to check the first entry. The old balance is entered the second time by reading it again from the column on the ledger from which it was first read. As it is unlikely that the same error would be made twice, this serves as a good check on the work.

Devices have been provided for testing the accuracy of the work by manipulating special keys to print a special character opposite the old balance in the "proof" column when the old balance has been entered the same in this column as in the "pick-up" column, but the difficulty with these devices is that they depend upon the operator manipulating them and the signal or character is not obtained until after all the work has been done including the second entry and printing of the old balance. Accordingly, if an error has occurred, it is already printed on the paper and it is necessary to draw lines through it and do all the work over again.

The present invention is directed to overcoming these difficulties by preventing operation of the machine unless the second entry of the old balance is exactly like the first entry. The machine is so constructed that it is impossible for the operator to depress any keys in the "proof" column other than the ones originally depressed in the "pick-up" column and an operation of the machine cannot be obtained until all of these keys are depressed. When the last key is depressed, the machine is automatically operated without requiring manipulation of the usual motor bar.

This result is accomplished by providing a proving mechanism operated by the amount keys so that, when an entry is made in the "pick-up" column, said entry is set up in the proving mechanism. This mechanism is then automatically moved to an inactive position to permit subsequent machine operations independently of it, until the paper carriage reaches the "proof" column where the proving mechanism again becomes active automatically to lock all the amount keys against depression except those depressed in the "pick-up" column. Combined with this is a means for preventing operation of the machine until all the proper keys have been depressed, but when they have been depressed, depression of the last one, no matter which it is, causes operation of the machine.

The general object of the invention is, therefore, to provide an improved proving mechanism for accounting machines.

A more particular object is to provide an improved automatic bookkeeping machine wherein operation of the machine is prevented in the "proof" column unless the keys depressed for entering the item in said column are exactly the same as those depressed in the "pick-up" column.

Another object is to provide an automatic book-keeping machine in which it is impossible, when the machine is in the "proof" column, to depress any amount keys, other than the keys that were depressed in the "pick-up" column, and wherein it is impossible to set the machine into operation unless all of the proper keys are depressed.

A further object is to provide a construction in which the machine will automatically be set in operation when the last of the proper amount keys is depressed in the "proof" column regardless of which one is last depressed.

Another object is to provide a machine of the class described in which the work may be speeded up through the elimination of certain operations and because of the early setting of the devices in such a way as to leave the keys free for manipulation by the operator.

Still another object is to provide a machine of the class described in which operation is prevented in the "proof" column unless the subtraction lever is in the same position in said column as it was in the "pick-up" column.

Other objects and advantages of the invention will hereinafter appear.

An embodiment of the invention is shown in the accompanying drawings in which;

Fig. 9 is a plan view of the proving mechanism illustrated in Fig. 2.

Fig. 10 is a partial side elevation of the carriage controlled connections for the proving mechanism showing the position of the parts when the carriage is in the "pick-up" column with the machine in normal condition.

Fig. 11 is a side elevation similar to Fig. 10 showing the position of the parts with the machine in operation while the carriage is in the "pick-up" column.

Fig. 14 is a detail side elevation of a special key control for the proving mechanism, the parts being in locked position.

Fig. 15 is a detail side elevation similar to Fig. 14 showing the parts in position for releasing the proving mechanism.

Fig. 16 is a partial side elevation showing the subtraction lever and its control connections, the parts being in the position they occupy when the carriage is in the "pick-up" column with the lever in add position.

Fig. 17 is a detail side elevation of the subtraction lever with its connections for controlling the proving mechanism, the parts being in the position they occupy when the carriage is in the "proof" column with the lever in "add" position.

Fig. 18 is a detail side elevation of the subtraction lever and its connections in the position they occupy when the carriage is in its "pick-up" column with the lever in "subtract" position.

Fig. 19 is a detail side elevation of the subtraction lever and its connections showing the parts in the position they occupy when the carriage is in its "proof" column and after the lever has been moved to add position from its Fig. 18 position.

Fig. 20 is a detail plan view of the pass-by pawl and associated parts shown in Figs. 15 and 16.

Fig. 22 is a detail view of the carriage roller and the levers controlled by it showing the position of the parts when the levers are latched in position.

Fig. 23 is a view similar to Fig. 22 showing the unlatched position of the parts.

Fig. 24 is a partial end elevation of the levers illustrated in Figs. 22 and 23.

Fig. 25 is a plan view of a form showing an example of the work that may be performed on the machine.

General construction

The invention is illustrated in connection with a motor driven Burroughs bookkeeping machine, the general features of which are well known and need not be described in detail for an understanding of the present invention.

Figure 1:
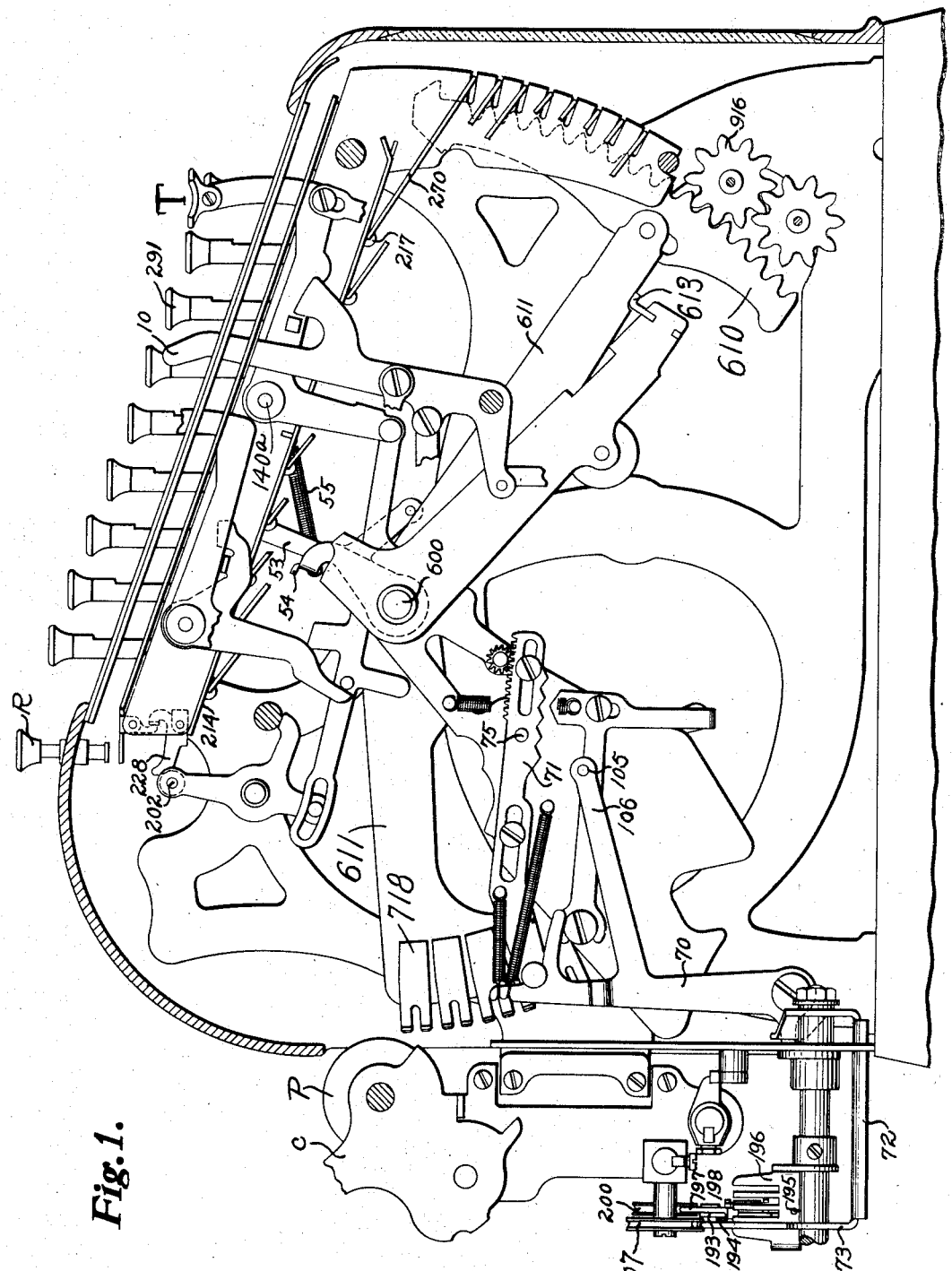
Figure 1 is a side elevation of a Burroughs bookkeeping machine to which the invention is applied, said view illustrating some of the principal parts of such a machine, but not including all the details.

Briefly, the machine is provided with actuator racks 610 carried by arms 611 on the rear of which are printing types 718 that are positioned relative to the platen P on the traveling paper carriage C. The machine has one or more counters 916 for cooperation with the actuator racks, a subtraction lever 10 for conditioning the machine for addition and subtraction, and a plurality of amount keys 291 which, when depressed, pull wire stops 270 into position to arrest the actuator racks in differential positions. When an amount key is depressed, it rocks its bell crank detent 217 clockwise and moves a slide 214 (Fig. 2) rearwardly where it is held by a latch 228. Individual column release keys R (Fig. 1) are provided for releasing the latches 228 and a universal restoring bail 202 releases all of them at the completion of each operation of the machine. The latches may also be released by a general error key, not shown, but of well known construction.

The traveling paper carriage C automatically tabulates in one direction as the machine is operated and it is automatically returned, after it has tabulated a predetermined distance in one direction, by a motor driven mechanism shown in Rinsche Patent No. 1,580,534 to which reference is made for details. The machine has the usual motor or starting bar which is depressed to cause the machine to be given a stroke of operation by the motor.

Inasmuch as all these parts are well known in the Burroughs machine, it is not considered necessary to describe them in further detail, reference being made to the many patents in the art on the Burroughs machine.

Proving mechanism as controlled by amount keys

As previously mentioned, after an old balance is entered in the "pick-up" column, the machine operates as usual in succeeding columns until it reaches the "proof" column where devices set in the "pick-up" column come into play to check the "proof" column work against the work in the "pick-up" column.

The proving mechanism is set, in the embodiment of the invention illustrated, by depression of the amount keys when the carriage is in its "pick-up" position, after which said mechanism is automatically rendered inactive and the amount keys are left free to operate in other columnar positions of the carriage until the carriage reaches its "proof" column where the proving mechanism comes into action to lock all the amount keys except those that were depressed in the "pick-up" column. It is then not only impossible to depress any keys except those depressed in the "pick-up" column, but it is also impossible to operate the machine until all the proper amount keys have been depressed, whereupon the machine operates automatically without requiring a depression of the motor bar. There is a proving mechanism for each bank of keys but, in order to avoid confusion, the mechanism will be described for one bank only and for operation by one key only, it being understood that the mechanism for the other banks is the same and that the operation by other amount keys of the same bank is the same as the operation by the key illustrated.

Figures 2, 3, 4, 5:
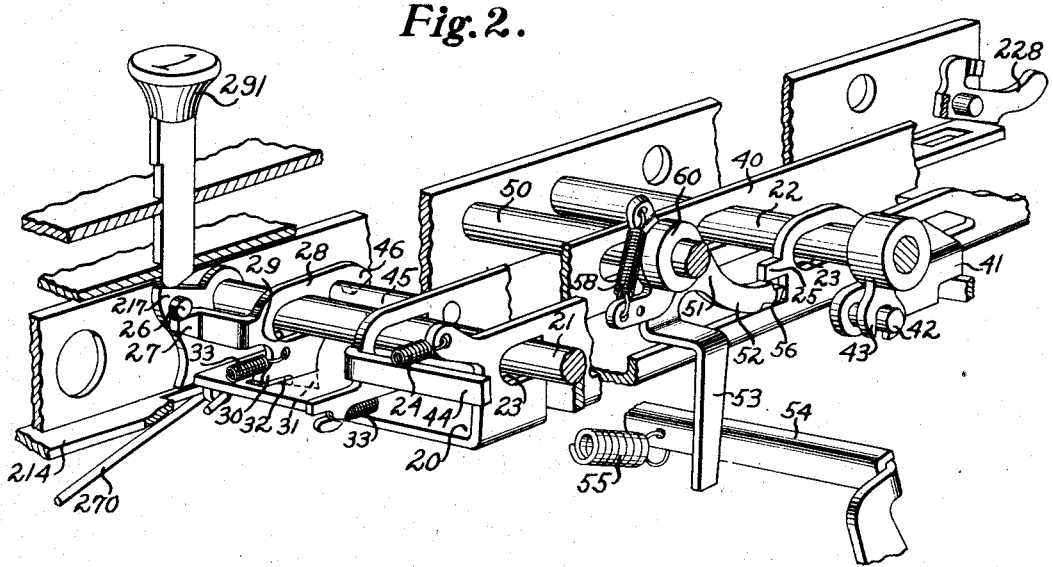
Fig. 2 is a perspective view of the proving mechanism controlled by the amount keys, said view showing only one key and the mechanism associated therewith and being spread so as to be clear.
Fig. 3 is a detailed perspective view of one of the elements of the mechanism shown in Fig. 2.
Fig. 4 is a detailed perspective view of portions of the slides associated with the mechanism of Fig. 2.
Fig. 5 is a perspective view of one of the amount keys and the proving mechanism associated therewith showing the position of the parts when the key is depressed with the carriage in the "pick-up" column and prior to operation of the machine.

Referring to Fig. 2, there is mounted beside the bank of keys, of which the "1" key is illustrated, an L-shaped slide member or plate 20 which is slidably mounted on shafts 21 and 22 that project through slots 23 in the plate 20. The sliding member is urged forward by a spring 24 but it is detained under certain conditions by a locking projection 25, the purpose of which will be later described.

The key, which is designated as the amount key 291, has a stem cooperating with the usual detent 217 which moves the stop wire 270 to position the latter to determine the extent of movement of the actuator rack for its bank. The key is latched in its depressed position by the plate 214 held in its rearward position by the latch 228.

The detent 217 is provided, in this case, with a stud 26 positioned so as to engage the nose 27 of a dog 28 that is pivotally and slidably mounted on the shaft 21, the sliding movement being permitted by the slot 29 in the dog through which the shaft 21 projects. The lower part of the dog 28 has a tail piece provided with a forward projection 30 normally above the sliding plate 20, and a rear downwardly extending projection 31, the latter projecting into a slot 32 in the plate 20. Depression of the key 291 will rock the detent 217 counter-clockwise which, in turn, will rock the dog 28 counter-clockwise and its tail piece 31 will move the slide 20 rearwardly. Each dog is urged clockwise toward its normal position by a spring 33, some of which are connected to the keyboard cross plates and others to the slides 40 (Fig. 8) described later. When the dogs 28 are in their normal position shown in Fig. 2, the slide 20 may be moved rearwardly relative to the dogs inasmuch as the forward projections 30 of the dogs are above the surface of slide 20, and hence, when one of the amount keys in a bank is depressed, the slide 20 for that bank is moved rearward under the detents 28 of the undepressed keys to prevent depression of them.

Figure 6:
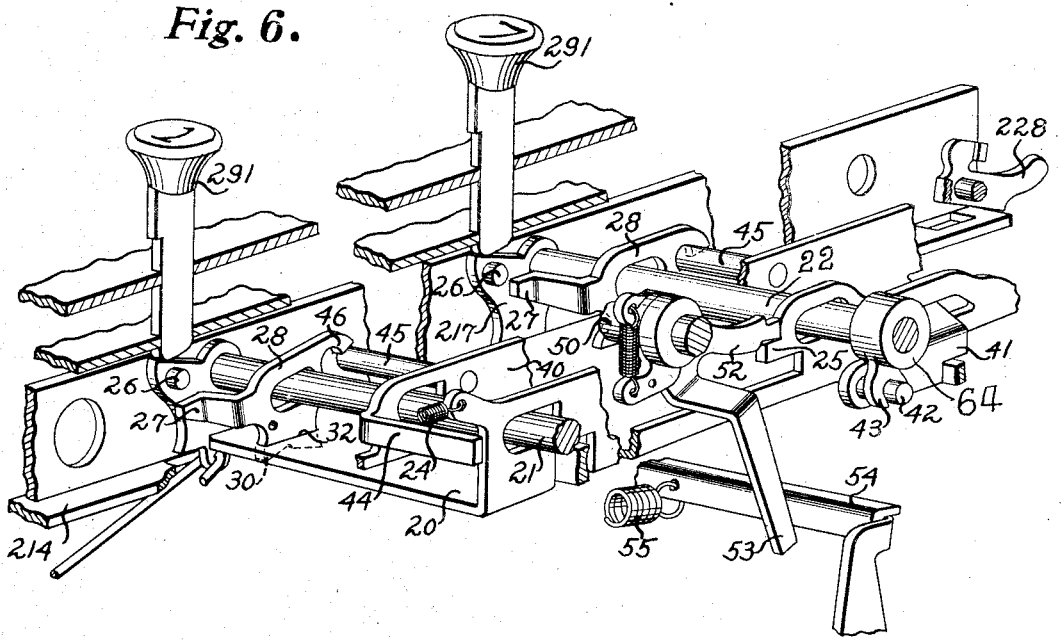
Fig. 6 is a perspective view similar to Fig. 5 after the machine has been given a stroke of operation and the carriage has moved away from the "pick-up" column.

A second slide 40 is mounted on the shafts 21 and 22, which slide has a downwardly and outwardly extending projection 41, illustrated most clearly in Fig. 4, carrying a stud 42 straddled by the bifurcated end of an arm 43 fixed to the shaft 22. The shaft 22 is rocked counter-clockwise, as viewed in Fig. 2, in certain operations of the machine, and this results in moving the slide 40 rearwardly, said slide being provided with a lateral lug 44 at its forward end for engaging the slide 20 for a purpose that will later appear. The slide 40 carries a series of studs 45, one of which is shown in Figs. 2 and 4, and two of which are shown in Fig. 6, engaging notches in the rearwardly extending tails 46 of the dogs 28. It will be understood that there is one of these dogs 28 for each amount key and a stud 45 for each dog. When the slide 40 is moved rearwardly, it carries the studs 45 with it and all of the dogs 28 whose tails 46 have their notches engaging their studs 45 are carried rearwardly so that their noses 27 are moved out of the paths of the studs 26 on the detents 217. The pin and slot mounting of the dogs 28 permit this movement.

Pivoted loosely on the rock shaft 50 is a locking member 51 (Fig. 3) having a rearwardly extending arm 52 and a downwardly extending arm 53. The rear arm operates in conjunction with the locking projection 25 on the slide 20 and the downwardly extending arm 53 controls a cross bail 54 (Fig. 2) which is urged forward by a spring 55 (Fig. 6) and which controls the motor driving connections. The rear end of arm 52 has a shoulder 56 whose function will be later described. The member 51 has an ear 57 to which one end of a spring 58 is connected. The other end of this spring is connected to an arm 59 extending from a collar 60 fixed to shaft 50. The collar has a lateral lug 61 extending over the arm 52 of member 51. This construction provides connections between the shaft 50 and the locking member 51 pivoted loosely on it such that, when the shaft 50 is rocked counter-clockwise, as viewed in Fig. 3, the member 51 is yieldingly moved with it through the counter-clockwise movement of arm 59 which pulls on the spring 58 to rock member 51. When the shaft 50 is rocked clockwise the member 51 is positively moved by the engagement of the lug 61 with the arm 52.

The collar 60 also has a second lateral lug 62 which extends in the opposite direction and which is illustrated in exaggerated length in Fig. 3, the actual length being shown more accurately in Fig. 9. This lug extends over a flattened surface 63 on an adjacent locking member 51ᵃ for the purpose of positively moving the member 51ᵃ clockwise as the shaft 50 is moved clockwise. When the shaft 50 is rocked counterclockwise as viewed in Fig. 3, the member 51ᵃ is yieldingly moved with it through the counterclockwise movement of arm 59 which pulls on a spring 58ᵃ connected between arm 59 and the lug 57ᵃ on member 51ᵃ. This connection between the one collar 60 and the two locking members 51 and 51ᵃ is merely for simplicity of construction. Some provision must be made to turn all the members 51 and 51ᵃ with the shaft 50 and, instead of using a collar 60 for each member 51, and 51ᵃ, a single collar is made to serve two of said members. This is made easily possible by the grouping of the slide plates and devices for each bank of keys. As shown in Fig. 9, these slides and associated connections are grouped in pairs between partition plates, that is, the devices for the right hand key 291 in Fig. 9 are to the left of said key and the devices for the left hand key are to the right. The slides are held spaced by springs 65 on the shafts 21, by the collars 60 on shaft 50, and by the collars 64 formed integral with the arms 43.

Figure 21:
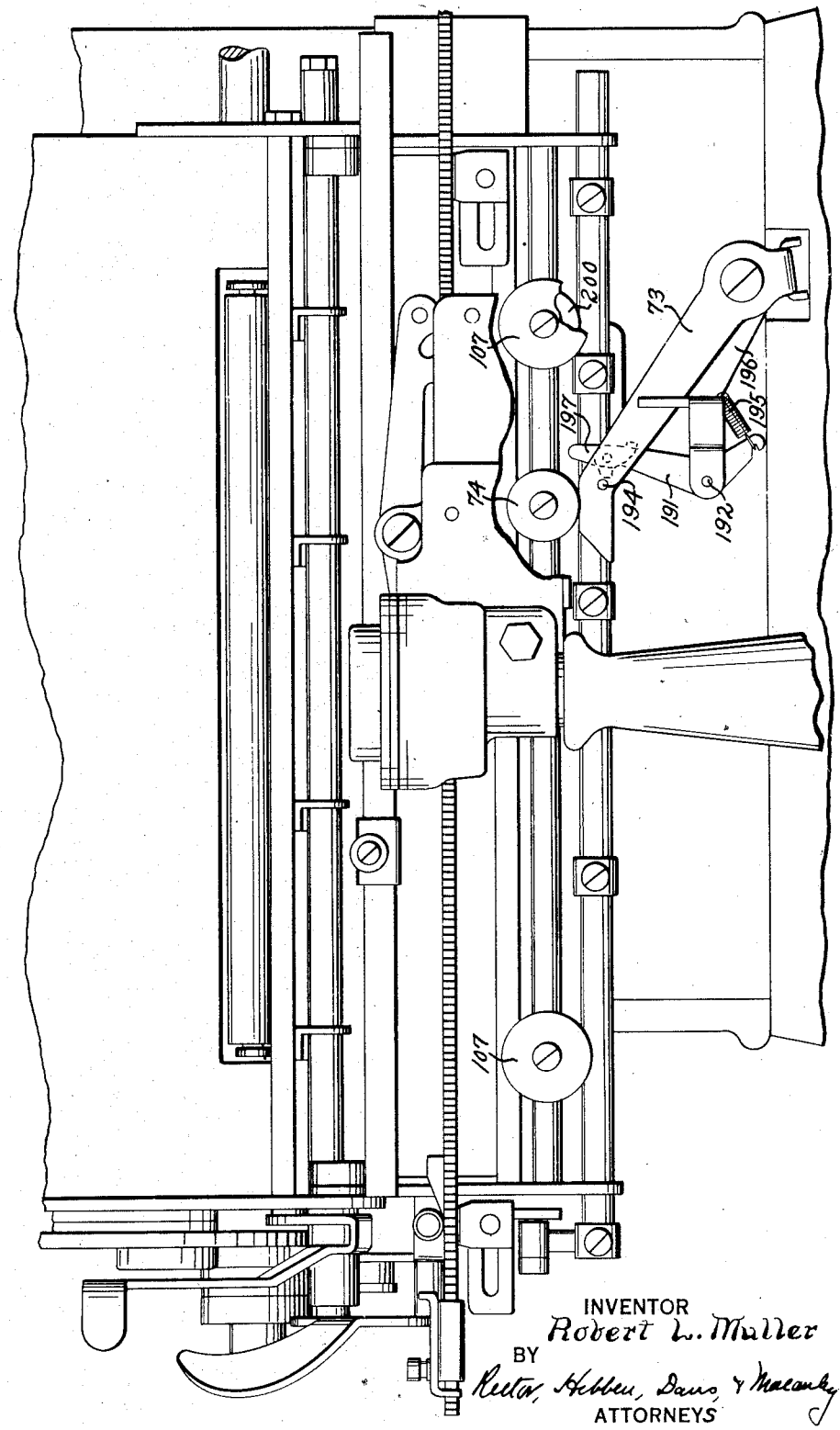
Fig. 21 is a rear elevation of a portion of the paper carriage, showing particularly the control bar.

The shafts 22 and 50 are rocked counter-clockwise as viewed in Fig. 2 by mechanism illustrated in Figs. 10 and 11. The paper carriage C controls a pivoted member 70 which operates a rack 71 that controls the hammer blocking mechanism of the machine as described in Gascon Patent No. 1,395,991. The member 70 is moved counter-clockwise different distances by means of a yoke shaped control member 72, shown in Fig. 1, having an arm 73 adapted to be engaged by a roller 74 (Fig. 21) on the carriage. The rack 71 carries a stud 75 projecting in position to engage the tail of a pass-by pawl 76 pivoted on the end of a swinging member 77, the pawl being urged to a normal position by a spring 78 and having a limit stop in the form of a stud 79 which engages the edge of the member 77. The member 77 is pivoted at 80 to the end of an arm 81 of a bell crank lever pivoted loosely on the shaft 600, said lever having a second arm 82 with a laterally extending lug 83 on its end. The bell crank lever 81—82 is urged counter-clockwise by a spring 84. The swinging member 77 has a central projection 85 having a notched end 86 adapted to engage a stud 87 on the end of an arm 88 fixed to the shaft 600. At each operation of the machine, the shaft 600 is first rocked clockwise from its Fig. 10 to its Fig. 11 position and then returned counter-clockwise to normal. When the central projection 85 is in the path of the stud 87, the member 77 will be raised with the arm 88, as the shaft rocks clockwise. Normally the projection 85 is urged by a spring 89 to the right of and out of the path of the stud 87 but, when the carriage reaches a predetermined columnar position, which, in this case, is the "pick-up" column, the lever 70 is moved counter-clockwise causing the stud 75 on the rack 71 to position the member 77 with its central projection 85 in the path of the stud 87 as shown in Fig. 10. Accordingly, when the machine is operated with the carriage in the "pick-up" column, the member 77 is carried upwardly and the bell crank lever 81—82 to which the member 77 is pivoted, is rocked clockwise to its upward position where it is latched by the notched end 90 (Fig. 10) of a pivoted latch 91 which is urged by a spring 92 (Fig. 11) to a latching position. The latched position of the parts is illustrated in Fig. 11. As the bell crank lever 81—82 is rocked clockwise it carries with it a member having two arms 93 and 94. said member being pivoted to the shaft 95 and the arm 94 having a pin and slot connection 96 with the arm 81 of the bell crank lever. The upper arm 93 of the two-armed member has a notched end 97 engaging a stud 98 on the arm 99 fixed to the shaft 50 which extends across the machine. The edge of the arm 93 is also positioned to engage a stud 100 on the three armed member 101 fixed to shaft 22. The member 101 has a downwardly extending arm 102 for engaging the bail 54. The arm 99 and the member 101 are urged counterclockwise by springs 103 and 104 respectively.

Accordingly, when the member 77 is pushed upwardly the bell crank lever 81—82 rocks clockwise which rocks the member 93—94 counter-clockwise and carries the arms 99 and 101 clockwise to rock the shafts 50 and 22 clockwise as viewed in Fig. 10 which would be counter-clockwise as viewed in Fig. 2. Movement of member 101 clockwise moves the bail 54 rearward to free the arms 53. The arm 93 picks up the arm 99 slightly prior to picking up the member 101 so that the shaft 50 starts to move slightly prior to the shaft 22. After the described movements of the shafts have taken place the parts are latched in position by means of the latch 91 previously described and they are thus held until the latch is tripped, which tripping is accomplished by means of a stud 105 on a forwardly extending arm 106 of the pivoted lever 70. When the paper carriage reaches a predetermined columnar position which, in this case, is the "proof" column, the lever 70 is moved counter-clockwise farther than in the "pick-up" column, through the medium of a roller of larger diameter on the carriage. The movement is sufficiently far to cause the stud 105 to engage the tail of the latch 91 and move it sufficiently to release the arm 82 whereupon the arm and associated parts return to normal under the influence of spring 84.

The mechanism thus far described has other devices associated with it, but the invention will be more clearly understood by explaining, at this point, how the mechanism thus far explained is operated and controlled by the amount keys and the paper carriage.

Operation of proving mechanism under control of amount keys

Assume that, with the paper carriage in "pick-up" position, the "1" key is depressed to enter the item 1 in the bank of keys illustrated in Figs. 2, 5 and 6.

When the "1" key is depressed the detent 217 is rocked downwardly and the key is latched in depressed position in the usual manner by the key locking slide 214. The downward movement of the detent 217 rocks the dog 28 to the position of Fig. 5 and moves the slide 20 rearwardly as illustrated in said figure. This moves the locking projection 25 out of the path of the arm 52 so that the latter may move counterclockwise from the position of Fig. 5. It will be understood that none of the other keys in the same bank are depressed and hence none of the other dogs 28 are rocked. Instead, all of them remain in the position of the dog illustrated in Fig. 2. The same action takes place in every other bank in which an amount key is depressed, that is, the depression of any key in the bank moves the slide 20 rearwardly and the dog 28 for that key is tilted downwardly. In banks of keys in which no key is depressed, the dogs 28 will not be rocked and the slides 20 will not be moved rearwardly by the entry of the items on the keyboard.

Figure 8:
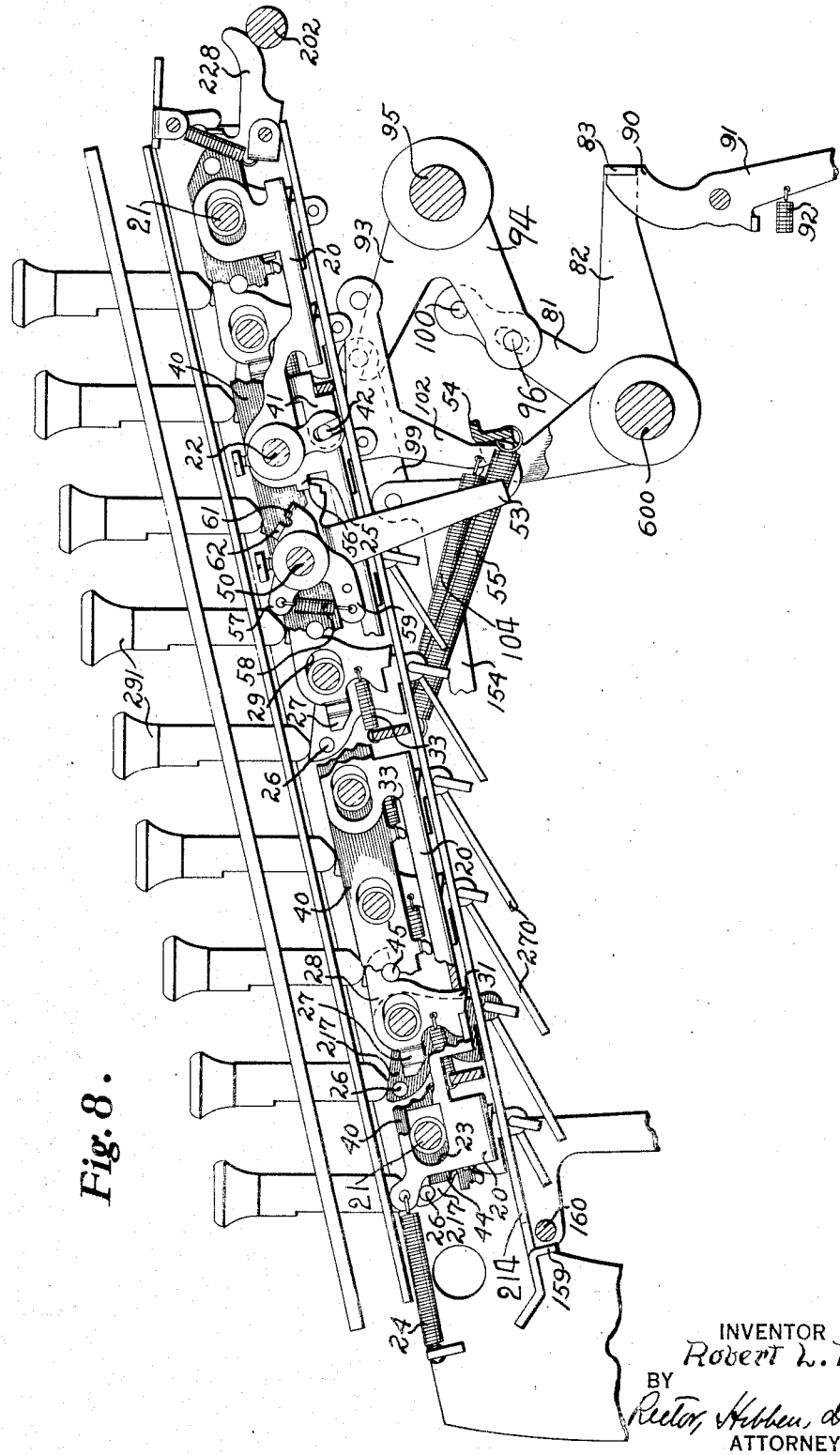
Fig. 8 is a longitudinal sectional elevation illustrating the position of the parts for a bank of keys in which no key was depressed.

At the time the carriage moved to its "pick-up" column the roller 74 operated arm 73 which moved lever 70 and positioned the projection 85 of member 77 in the path of stud 87 on the arm 88 which is rocked by the 600 shaft. Accordingly, when the machine is operated after the depression of the "1" key as above described, the shafts 22 and 50 are rocked counter-clockwise from the position of Fig. 5 and latched in place by the latch 91 (Figs. 8, 10 and 11).

The counter-clockwise movement of the shaft 22 moves the slide 40 rearwardly by means of the connections 42—43 (Fig. 2) and this rearward movement of the slide carries all the studs 45 rearwardly, which studs move the dogs 28 rearwardly to move their forwardly projecting noses 27 out of the paths of the studs 26 on the detents 217.

The dogs 28 in all banks of keys where a key has been depressed are free to move rearward because the plates 20 have already been moved rearward and the slots 32 leave an open space to the rear of the dogs. In banks of keys where no key has been depressed the slides 20 are moved rearward by operation of the machine. The counter-clockwise movement of shaft 22 moves the slides 40 rearward and said slides carry the slides 20 with them by means of the overlapping projections or lugs 44. The rearward movement of the dogs 28 occurs for every key in every bank except the depressed keys. A depressed key has tilted its dog 28 downwardly so that the notch in its rearwardly projecting tail 46 does not engage over its stud 45 and hence rearward movement of the stud does not carry the depressed dog rearwardly.

From this it will be seen that all of the dogs 28 of the undepressed keys are carried back to positions such that the amount keys may be freely manipulated independently of them. The depressed keys, such as the "1" key, are also free because their dogs have already been depressed and are held depressed by the forward edges of the slots 32 in plates 20 which engage the forward projections 30 on the dogs 28, the plates 20 still being held rearward owing to the fact that the "1" key is still latched down and also by other mechanism as will presently appear.

The counter-clockwise movement of the shaft 50 tends to rock the members 51 with their arms 52 counter-clockwise from their Fig. 2 position. As viewed in said figure, this movement of arms 52 would be prevented by the locking projections 25 but, in the operation of the machine, said projections are moved to permit certain movements of the arms 52.

In banks of keys where a key has been depressed the slides 20 have been moved rearward and the locking projections 25 in these banks are clear of the arms 52 as shown in Fig. 5. As the machine is given a stroke of operation the shaft 50 is rocked counter-clockwise and latched in its rocked position as previously described. This moves the arms 52 upward past the locking projections 25 in banks of keys where a key has been depressed. As the machine reaches the end of its stroke of operation in the "pick-up" column, the depressed amount keys are released in the usual manner and this frees the slides 20 as far as their being held by depressed amount keys is concerned. The slides tend to move forward under the influence of their springs 24, but they are blocked after a short movement in banks of keys where a key was depressed, by the engagement of the ends of the arms 52 with the slides as shown in Fig. 6. Although the slides 20 may move forward slightly the slides 40 do not move because the shaft 22 is latched in position. The dogs 28 corresponding to undepressed keys are thus held rearward out of the paths of the studs 26 on the detents 217 of said keys as illustrated for the "7" key in Fig. 6. This leaves the keys free to be depressed without affecting the proving mechanism. The previously depressed keys are also free to operate because their dogs 28 have already been moved down and are out of the way. The slight forward movement of the slides 20 from their Fig. 5 to their Fig. 6 positions rocks the depressed dogs 28 up slightly and if one of the previously depressed keys is again depressed its slide 20 is again moved rearward but its arm 52 does not move down as it is held up owing to the fact that the shaft 50 is held latched in the position to which it was moved.

In banks of keys where no key was depressed the action is slightly different. In these banks the slides 20 are moved rearwardly by the slides 40 which, in turn, are moved by the counter-clockwise movement of the shaft 22. As previously explained the shaft 22 is moved slightly after the shaft 50. Accordingly, in these banks, when the shaft 50 moves counter-clockwise, the arms 52 are moved into yielding engagement with the bottom of the locking projections 25. The rearward movement of the slides 20 in these banks is not enough to cause the projections 25 to clear the arms 52. Instead they move to the position illustrated in Fig. 8, that is, to a position such that the shoulders 56 on the arms 52 move in front of the ends of the locking projections 25. The slides 20 in these banks are thus temporarily blocked against returning and the dogs 28 for the keys are held out of the paths of the studs 26. The slides 20 are also blocked against returning by the projections 44 on the slides 40 which are held in position by the shaft 22 which is latched in its moved position. From this it will be clear that the amount keys in banks in which no key was depressed are free for operation after the carriage leaves its "pick-up" column.

After the proving mechanism has been moved to its inactive position above described, the machine is free to be operated in a normal manner, that is "charge" and "credit" items may be entered on the amount keys in the appropriate columns and the machine freely operated. The motor driving mechanism is free for operation for reasons which will be later explained.

As the carriage moves to its "proof" column a roller 107 (Figs. 21-24), which is slightly larger than the roller 74 that acted in the "pick-up" column, moves the lever 70 far enough counter-clockwise to cause the stud 105 to trip the latch 91, as previously explained, which frees the bell crank 81—82, whereupon it is returned to normal under the influence of spring 84. This moves the arm 93 downward and frees the arms 99 and 101 so that the shafts 50 and 22 are free to rock back to normal under the influence of springs 103 and 104 as far as the mechanism controlled by latch 91 is concerned. The bail 54 is also free to move as far as being blocked by member 101 is concerned. Clockwise movement of the shaft 22 (Figs. 6 and 7) carries the slide 40 forward again and positions the dogs 28 with their noses 27 under the studs 26 on the detents 217. The position of the parts is illustrated in Fig. 7 where the "7" key represents an undepressed key, while the "1" key represents a key that was depressed in the "pick-up" column.

Figure 7:
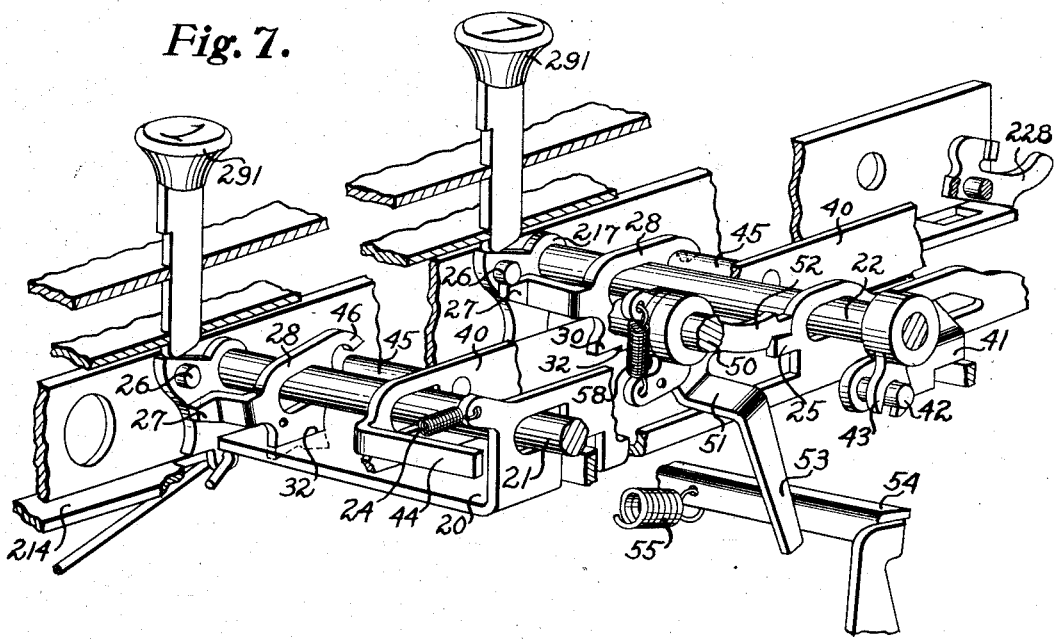
Fig. 7 is another perspective view similar to Fig. 5 showing the position of the parts when the carriage is in the "proof" column with certain of the keys locked against depression.

Although the shaft 50 tends to return clockwise in Figs. 6 and 7 under the influence of spring 104 (Fig. 11) at the same time as the shaft 22, it cannot return because of the engagement of the arms 52 with the locking projections 25 in the banks where a key was depressed. This means that the slides 20 cannot move forward to their normal positions owing to the engagement of the ends of arms 52 with the slides. In columns where no key was depressed the slides 20 are also blocked by the shoulders 56 of the arms 52 as shown in Fig. 8. The arms 52 in such banks remain in the Fig. 8 position until the last of the arms 52 in the other banks are released whereupon the arms 52 in the banks where no keys were depressed are moved downwardly by the clockwise movement of shaft 50.

When the parts are in this condition, illustrated for one bank in Fig. 7, the slots 32 in the slide 20 do not clear the forward noses 30 of the undepressed dogs 28 as shown for the dog of the "7" key. The result is that these dogs cannot be rocked downwardly and the keys which were not depressed in the "pick-up" column, cannot now be depressed in the "proof" column. The only keys that can be depressed are those that were previously depressed in the "pick-up" column and these keys can be depressed because their dogs 28 are already down in the position illustrated for the "1" key in Fig. 7. Accordingly, when the machine is in the "proof" column, the operator can enter only the same balance as was entered in the "pick-up" column because none of the keys can be depressed except those that were depressed in the "pick-up" column.

Also, unless all these keys, that is, the keys that were previously depressed in the "pick-up" column, are depressed in the "proof" column, the motor cannot be operated because the arms 53, of which there is one for each bank of keys, are not free to move forwardly or clockwise in Fig. 7. Projection 25 blocks the arm 52 and, for reasons that will be explained later, the motor cannot be started in the "proof" column unless the bail 54 is free to move forward from its Fig. 7 position.

When a key is depressed that was previously depressed in the "pick-up" column, such as the "1" key in Fig. 7, the stud 26 on the detent 217 engages the nose 27 of the dog 28 and moves the slide 20 rearwardly to free the arm 52 and allow the arm 53 to swing forward to free the bail 54 as far as that bank or keys is concerned. The arm 52 does not move, however, if any of the other arms 52 are not released because one arm will block movement of shaft 50 and prevent movement of the other arms. The slide 20 is held rearward owing to the fact that the depressed key is latched in depressed position by the usual plate 214. When the last of the depressible keys is depressed, and it does not make any difference which is depressed last, all of the arms 52—53 are freed, whereupon the shaft 50 may be rocked clockwise, as viewed in Fig. 7, by the spring 103 assisted by spring 55 which rocks the bail 54 forward, said bail being freed when the last of the arms 52—53 was freed. It will be understood that, during this time, all the keys in banks where no key was depressed in the "pick-up" column, were locked against depression but that, upon the freeing of the last arm 52—53 in the other banks, the bail 54 was freed for movement because the arms 52—53 in the banks in which no key was depressed were not above the projections 25. When the bail 54 is moved, the motor operates the machine automatically without requiring that the starting bar be depressed. In order to gain a complete understanding of the starting operation it will be necessary to understand the motor controlling mechanism which is as follows:

*Motor controlling connections*

Figure 12:
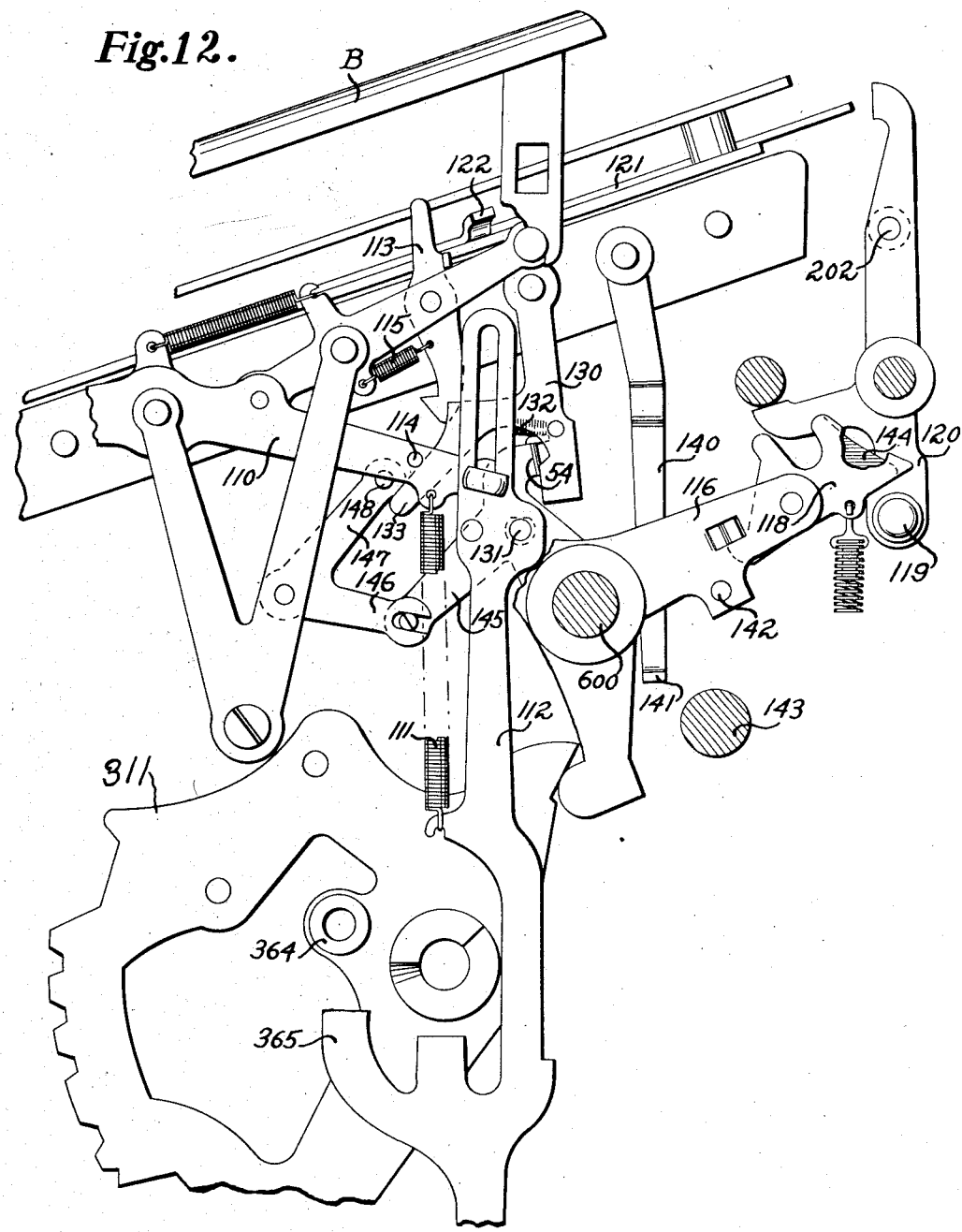
Fig. 12 is a detail side elevation of the motor starting mechanism and the locking means associated therewith, the parts being in normal position.

The motor is started by means of the usual motor starting bar B, Fig. 12, which, when depressed, rocks the lever 110 counterclockwise and tensions spring 111 to raise the link 112 to cause the motor to operate the machine. The arm 110 is latched in its upper position by means of a latch 113 having a hooked nose engaging under a stud 114 on the lever 110, the latch being normally urged to latching positon by a spring 115. The link 112 would be held up for a repeat operation of the motor were it not for the fact that the latch 113 is normally tripped at the end of each operation of the machine. This tripping is accomplished through the medium of an arm 116 fixed to the oscillating shaft 600 which rocks clockwise from the Fig. 12 position during the forward stroke of the machine and returns counterclockwise during the return stroke. The arm 116 carries a pass-by pawl 118 that passes the stud 119 upon the clockwise movement of the arm 116, but, upon the return or counterclockwise movement of the arm, the pass-by pawl engages the roller 119 and rocks the arm 120 counterclockwise. The upper end of this arm 120 contacts a slide 121 carrying a lateral lug 122 adapted to engage the tail of the latch 113 with the result that, at the end of the return stroke of the machine, the latch 113 is released, the lever 110 moves clockwise, and the link 112 moves downward to disconnect the motor, such downward movement of link 112 being caused by the engagement of a stud 364 on the full stroke sector 311 with a lateral lug 365 on the link 112.

In order to obtain an additional control of the link 112 for causing the motor to operate the machine, a swinging abutment 130 is provided which is adapted to be positioned in the path of a stud 131 on the link 112. The abutment 130 tends to swing in front of the stud 131 under the action of a spring 132 but it is normally held disabled by the stud 114 on lever 110 which engages a tail piece 133 integral with the abutment and cams the abutment counter-clockwise out of the path of the stud 131.

In the normal position of the parts with the motor bar raised (Fig. 12), the stud 114 keeps the abutment 130 out of the path of stud 131. As the motor bar is depressed, the lever 110 is rocked counterclockwise which moves the stud 114 out of contact with the tail 133 of abutment 130 but the link 112 moves with the lever 110 to move stud 131 in front of abutment 130 before the abutment has a chance to move. The lever 110 is latched in position to cause a repeat operation but, at the end of the return stroke of the machine, the latch 113 is tripped which permits the lever 110 to descend and, as it descends, its stud 114 contacts the tail 133 and moves the abutment 130 out of the path of the stud 131. At the same time, the link 112 is moved down by the full stroke sector to stop operation of the machine.

Figure 13:
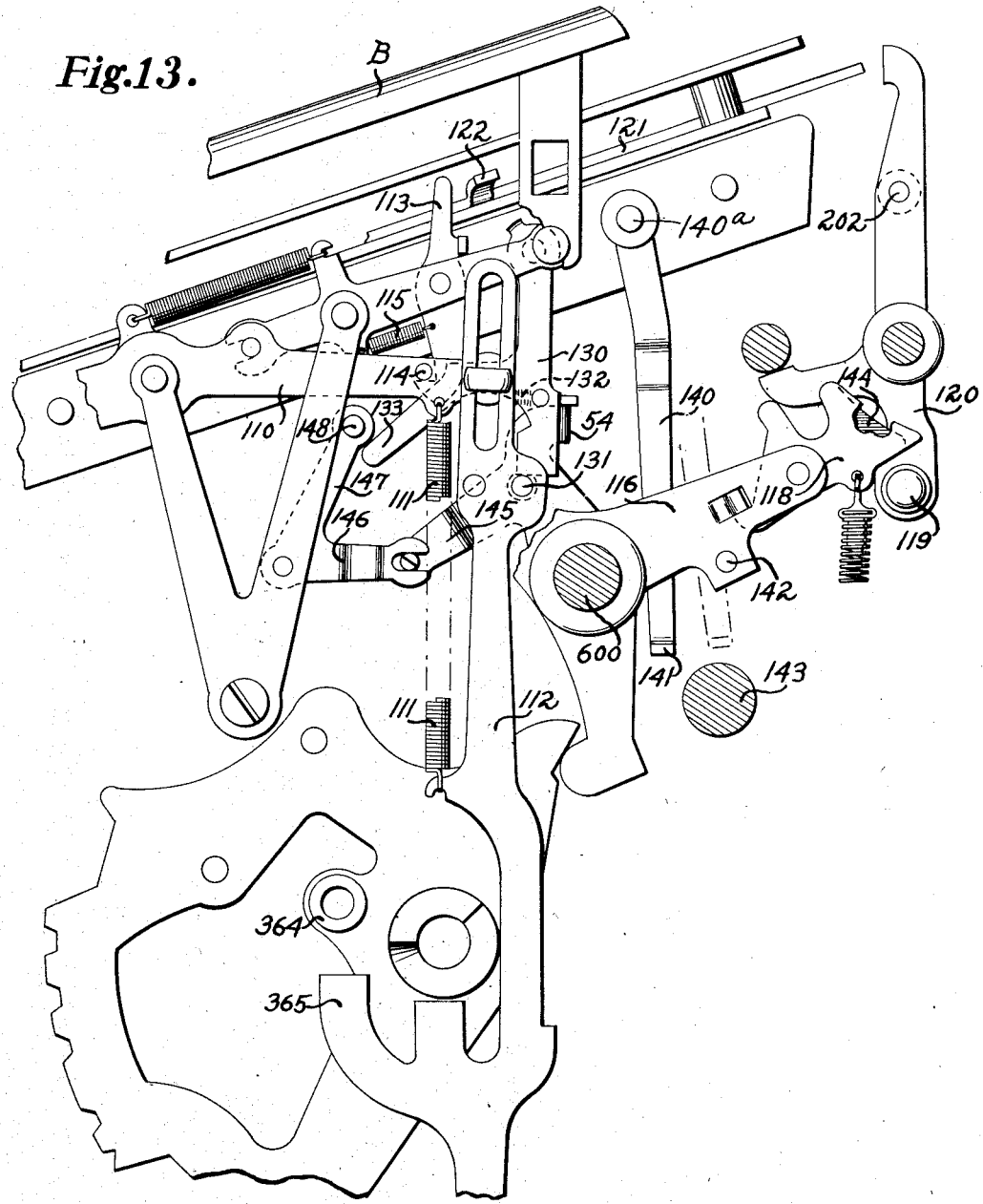
Fig. 13 is a detail side elevation similar to Fig. 12 showing the parts in the position they occupy as the machine finishes its stroke of operation in the "balance" column.

The preventing of the operation of the machine except under predetermined conditions is to take place in the "proof" column which, in the usual sequence of operations, follows the "balance" column where a total is taken. Advantage is taken of this fact to slightly change the condition of the motor controlling mechanism by the operation of taking a total in the "balance" column. When the usual total key T (Fig. 1) is depressed, the lever 140 (Fig. 13) connected to the shaft 140ᵃ to which the total key bell crank is connected is rocked a slight distance counterclockwise, as shown in dot and dash lines in Fig. 13, which is just sufficient to position a lateral lug 141 on its lower end in the path of a stud 142 carried by the arm 116. Normally, the arm 116 rocks clockwise sufficiently to contact the shaft 143 but, when the arm 140 is rocked rearwardly by the total key, the clockwise movement of the arm 116 is limited by the foot 141 and the arm is stopped sufficiently short to prevent the pass-by pawl 118 from passing the stud 119. Consequently, when the arm 116 returns counterclockwise the pass-by pawl does not operate on the stud 119 and there will be no releasing action on the arm 120 and the slide 121 as far as the pawl 118 is concerned. However, the arm 116 is provided with a second and slightly shorter pass-by pawl 144 which does pass the stud 119 under the conditions above described and, when the arm 116 returns counterclockwise, this pawl 144 operates on the stud 119 to rock the lever 120 counterclockwise. However, this shorter pass-by pawl does not rock the lever as far forward as does the pawl 118. It rocks it sufficiently to move the slide 121 to release certain other devices on the machine which are not important here, but it does not move the slide sufficiently far forward to trip the latch 113, with the result that the arm 110 does not move downwardly at the end of the return stroke of the machine and the abutment 130 is free to move into the path of the stud 131.

As the link 112 is moved downwardly by the full stroke sector in the manner previously explained, the stud 131 clears the end of abutment 130 and the latter is swung clockwise by its spring 132 so that its end is above the stud 131. This blocks the link 112 against rising, which it tends to do owing to the tension placed on spring 111 by the forced descent of link 112 while lever 110 is held latched.

Accordingly, when the carriage reaches the "proof" column, the lever 110 is latched in its upper position, (Fig. 13) and the spring 111 is under tension to raise the link 112 to start operation of the machine, but the link 112 is blocked against full movement until the abutment 130 is moved in some manner to free it of the stud 131.

As previously explained, the bail 54 is contacted by the arms 53 of which there is one for each key bank and these arms are blocked against movement in a clockwise direction by the mechanism heretofore described, that is, these arms can move when the machine is in the "proof" column only when exactly the same keys are depressed as were depressed in the "pick-up" column. As long as any one of these keys remains undepressed, the arm 53 for its bank prevents the bail 54 from moving to the left or toward the forward part of the machine under the tension of its spring 55 but, as soon as all of the keys have been depressed, the bail automatically moves to the left, thereby rocking the abutment 130 counterclockwise out of the path of the stud 131 by connections that will be presently explained, whereupon the link 112 rises automatically under the tension of spring 111 and starts operations. In this manner the motor operates the machine automatically when the last key of the series is depressed and it is immaterial which key is depressed last because the bail 54 is held out as long as any one key is not depressed and it moves forward as soon as all of them have been depressed.

The bail 54 moves the abutment 130 counterclockwise by means of an extension 145 (Fig. 12) having a pin and slot connection with one arm 146 of a pivoted bell-crank lever whose other arm 147 carried a stud 148 adapted to contact the extension 133 of the abutment 130. When the bail 54 moves forward under the influence of its spring the bell-crank 146—147 is rocked clockwise and the abutment 130 is moved counter-clockwise out of the path of the stud 131.

From the above it will be clear that, when the machine reaches the "proof" column, all of the keys are locked against depression except those that were depressed in the "pick-up" column and it is therefore impossible for the operator to enter anything but the same amount that was entered in the "pick-up" column.

If the operator should read the balance wrong and attempt to enter it wrongly in the "proof" column, he would be prevented from doing so because he could not depress the wrong keys. He is thus positively prevented from entering the balance wrongly in the "proof" column.

If the balance was entered wrongly in the "pick-up" column and the operator sees that he cannot depress one of the keys that should be depressed to enter the balance correctly in the "proof" column, he knows that an error has been made in the "pick-up" column. He must then release the keys and the proving mechanism and start over again. It will be noted that he is notified of the error before the machine is operated to put a wrong balance in the counters and before any printing occurs.

If no error has been made, the motor gives the machine a stroke of operation as soon as all of the proper amount keys have been depressed to enter the old balance in the "proof" column and it is unnecessary to depress the motor bar to start the machine. This eliminates an operation and speeds up the work.

It is desirable to otherwise prove the work under certain conditions and consequently there is combined with the above mechanism additional devices as follows:

*Special key for controlling proving mechanism when there is no "old balance"*

It may happen that there is no old balance to enter in the machine. In such event no amount keys would be depressed in the "pick-up" column with the result that, except for the devices hereinafter provided, the machine would be free to operate in the "proof" column. It is desired, however, to check the fact that there was no old balance and provision is made for this in the nature of a special release key shown in Figures 14 and 15.

Release key 150 is mounted at the left-hand side of the keyboard and provided with the usual detent 217 which, in this case however, has an extension 151 carrying a stud 152 adapted to engage the cam edge or projection 153 on a link 154. The forward end of this link has a shoulder 155 (Fig. 15) engaging over the edge of a slot in a stationary member 156. A spring 157 is connected to the link 154 and the member 156 to urge the link 154 into engagement with the bottom of the slot so that, when the shoulder 155 reaches the edge of the slot, the link will be pulled downwardly into a latched position. The rear end of the link 154 has a curved arm 158 that projects into the path of the bail 54 so that the link 154 prevents movement of the bail to prevent starting of the motor in the same way as do the arms 53 controlled by the amount keys. The normal position of link 154 is illustrated in Figure 14 where the shoulder 155 engages over the edge of the slot in member 156. In this position of the parts, the link 154 cannot move forwardly and this blocks movement of the bail 54 which prevents operation of the machine by the motor. The link 154 can be released by depressing the key 150 which causes the stud 152 to cam the link upwardly to raise the shoulder 155 above the edge of the slot in the member 156 whereupon the link 154 is free to slide forwardly and the bail 54 is released.

There is no reason for having this lock when any of the amount keys are depressed, and hence means is provided for disabling it under such condition. The slide 214 for each bank of amount keys has a hooked end 159 engaging over a shaft 160 extending across the machine. Connected with the shaft 160 is an arm 161 extending through a slot in member 156 and having a cam surface 162 adapted to engage under the lug 163 on the link 154 to which lug the spring 157 is connected. When any of the amount keys are depressed, the shaft 160 is moved rearward from its Fig. 14 position and the cam surface 162 of the arm 161 engages the lug 163 to raise the link 154 to free the shoulder 155 from the edge of the slot in member 156. Consequently, the special lock does not interfere with the ordinary operation of the machine because it is automatically disabled whenever any of the amount keys are depressed.

If no keys have been depressed in the "pick-up" column, when the "proof" column is reached, the condition of the proving mechanism in all banks will be as illustrated in Fig. 8, that is, the shoulder 56 of each of the arms 52 will be in engagement with the end of its projection 25. As the paper carriage reaches its "proof" column, the latch 91 (Fig. 11) is released as heretofore described which releases the shaft 50 which is urged clockwise as viewed in Fig. 8 by the spring 103 (Fig. 11). The arms 52, when in their Fig. 8 position, will not prevent clockwise movement of shaft 50 and, as far as these arms are concerned the shaft could move and the amount keys would be released. However, it will be observed in Fig. 11 that the link 154 connected with the special release key mechanism just described, is connected to the arm 99 fixed in the shaft 50. Inasmuch as the link 154 cannot move forward until the special release key is depressed, the arm 99 cannot move and hence the shaft 50 cannot rock clockwise as viewed in Figs. 6 and 7. The result is that the slides 20 cannot move forward to their normal positions and all of the amount keys will be locked against depression. This will indicate to the operator that no keys were depressed when the machine was in the "pick up" column. He must then depress the special release key 150 to release the machine. This releases the link 154 which thereupon moves forward releasing the arm 99 whereupon the shaft 50 is rocked and all of the amount keys are released. Also, at the same time, the bail 54 is released and it automatically moves to cause the motor to operate the machine. The link 154 does not interfere with the operation of the keys or the machine if an amount key is depressed in the "pick-up" column because the depression of any amount key automatically disables the special release mechanism so that the link 154 is free to move forward when the machine reaches the "proof" column.

It is to be noted that, if the release mechanism above described were not provided, all the keys would be released in the "proof" column under the conditions above mentioned because the shaft 50 would be free to rock if it were not blocked by the link 154. The special release mechanism therefore serves the purpose of cooperating with the proof mechanism to cause all the keys to be locked in the "proof" column when no keys were depressed in the "pick-up" column and, at the same time, the release mechanism can be manipulated to release the machine.

*Subtraction lever control of proving mechanism*

It is also desirable to have proof that the item has been entered as of the right sign, that is, positive or negative in accordance with a credit or debit balance. In order to secure this proof certain mechanism has been provided which is associated with the subtraction lever and illustrated in Figs. 16, 17, 18 and 19.

The lower end of the subtraction lever 10 has a laterally extending arm 170 carrying a stud 171 operating in the bifurcated end of an arm 172 fixed to a shaft 173 which also has fixed to it an arm 174 positioned to engage a stud 175 on an arm 176 pivoted at 177. The upper end of the arm 176 has a lateral lug 178 formed on it and it also carries a pass-by pawl 179 which is urged in a counter-clockwise direction by a spring 180. The lug 178 is adapted to engage in a notch 181 in a lever 182 when the parts are in normal position and the subtraction lever is in its "add" position. The arm 182 has a rearwardly extending lower end 183 engaging over the stud 105 on the branch 106 of the pivoted lever 70 which is set by the carriage in certain of its columnar positions. A spring 184 assisted by a spring 184$^a$ urges the lever 182 in a counter-clockwise direction, a limit stud 185 being provided for contact with a projection 186 on extension 183.

The position of the parts when the subtraction lever is in "add" position and the carriage is in the "pick-up" column is illustrated in Fig. 16. The controlling roll on the carriage which acts in the "pick-up" position has moved the arm 106 counter-clockwise a short distance but not sufficient to position the shoulder 181 under the lug 178. The subtraction lever 10 is free to be moved forward to "subtract" position and it remains free while the carriage is tabulating through its intermediate or "transaction" positions. For example, if, in an intermediate column, the lever is moved forward to "subtract" position, the arm 174 will be swung clockwise and it, in turn, will swing the arm 176 counter-clockwise. This will tension the spring 184 and, as soon as the subtraction lever moves back to addition position which it normally does after each operation in a Burroughs machine, the spring 184 will move the lever 176 back to its normal position illustrated in Fig. 16.

After the carriage leaves the "balance" position and prior to the time it reaches the "proof" column, another roll 107 on the carriage moves the arm 106 counter-clockwise and this time it is moved to a greater extent than in the "pick-up" column. The distance of movement is sufficient to move the notch 181 in the upper end of arm 182 under the end of the lug 178 with the result that, when the carriage moves to its "proof" column, the subtraction lever is locked in "add" position owing to the fact that the notch 178 blocks counterclockwise movement of the lever 176 which in turn blocks movement of the arms 174—172 and thereby blocks movement of the lever 10. Accordingly, if the item in the "pick-up" column has been entered with the lever 10 in the "add" position, said lever cannot be moved to its "subtract" position, when the carriage reaches the "proof" column and hence the item must be entered in the "proof" column as a positive item.

If, when the carriage is in the "pick-up" column, the lever 10 is moved to its "subtract" position in order to enter the item as a negative item, the parts assume the condition illustrated in Fig. 18. Movement of the lever 10 to subtract position moves the arm 174 clockwise which moves the arm 176 counter-clockwise against the tension of the spring 184. The pass-by pawl 179 moves past a stud 187 on the arm carrying the bail 54 and the parts are in the Fig. 18 position. The pawl 179 can pass stud 187 under these conditions because bail 54 occupies its Fig. 16 position where shoulder 188 on pawl 179 is beyond the stud 187 (see also Fig. 20). After the item is entered the subtraction lever 10 automatically moves back to add position under the influence of a spring shown at 84 in Muller Patent No. 1,397,774 which frees the arm 176 whereupon the spring 184 moves the arm to its Fig. 19 position where the pawl 179 contacts stud 187, the bail 54 having moved to its Fig. 19 position where the stud 187 is in the path of pawl 179. The pawl is arrested with the shoulder 188 in front of the stud 187 (Fig. 19). This prevents the bail 54 from moving forward but this does not interfere with operating the machine until the "proof" column is reached. The reason it does not is that the bail is active in preventing operation of the controlling mechanism only when said mechanism is conditioned in the "balance" column for automatic operation as heretofore described. In other words, it is only when the parts are in Fig. 13 condition that bail 54 controls abutment 130.

When the carriage reaches its "proof" position the controlling mechanism is conditioned for automatic operation and the bail 54 must be free to move forward before operation can be effected. If, under these conditions, the subtraction lever is moved to the same position it occupied in the "pick-up" column, to-wit: the "subtract" position, the arm 174 engages arm 176 and the parts are moved back to the Fig. 18 position. The shoulder 188 is moved out of the path of stud 187 and the bail 54 is free to move forward. If, however, the subtraction lever should remain in add position, as shown in Fig. 19, the lever 176 is not moved to its Fig. 18 position but remains in its Fig. 19 position. The shoulder 188 then blocks the bail 54 which must move forwardly in order to cause the motor to operate the machine. The bail can be released only by pulling the subtraction lever to subtract position which causes the arm 174 to engage the stud on the arm 176 and draw the latter back to the Fig. 18 position where the shoulder on pawl 179 is below stud 187 and the bail 54 is free to move and the machine may be operated.

From this it will be clear that, if an item is entered in the "pick-up" column with the subtraction lever in "subtract" position, the mechanism is set so that the machine cannot be operated when the carriage is in the "proof" column unless the subtraction lever is in subtract position. In other words, if the item is entered in the "pick-up" column with the machine in "subtract" condition the machine cannot be operated in the "proof" column unless the machine is put in "subtract' condition.

The parts move to normal after the machine is operated in subtract condition in the "proof" column owing to the fact that, when the bail 54 moves forward, the stud 187 moves forward to a point beyond the shoulder 188 on the pawl 179 (see Fig. 20) so that the pawl and the arm 176 are free to be moved up to normal position by the spring 184.

*Early conditioning means for increasing speed of proof*

After the new balance has been printed in the "balence" column the paper carriage is returned across the machine and stopped in the "proof" column. It is always desirable, in bookkeeping machines, to quickly condition the machine for the next operation so that, if possible, the operator can be entering items on the amount keys while other parts of the machine are moving to position. In the present instance provision is made for conditioning the machine so that the operator can enter the items on the amount keys for work in the "proof" column while the carriage is tabulating from its "balance" column across the machine to its "proof" column.

When the machine is operated in the "balance" position, which is not until the end of the travel of the carriage in one direction, the tabulating mechanism releases the carriage and it moves a short distance in the same direction that it has been traveling after which the automatic returning mechanism reverses the direction of movement and the carriage is moved across the machine to its "proof" column. This short movement of the carriage prior to its return is a known feature in the Burroughs machine and is disclosed in the Rinsche patent heretofore mentioned. Advantage is taken of this short movement to condition the machine for work in the "proof" column before the carriage actually reaches this column, such mechanism being illustrated in Figs. 21, 22, 23, and 24.

The control roll 107 on the carriage is positioned so that it comes into operation to depress the arm 73 when the carriage moves through its short path of movement after its last columnar position and just prior to its reversal. Depression of this arm 73 releases shafts 22 and 50 and conditions the proving mechanism, as heretofore explained, so as to prevent operation of any of the amount keys other than those that were depressed when carriage was in its "pick-up" column. In other words, the proving mechanism is rendered active by movement of lever 73 during the slight movement of the carriage just prior to its return across the machine to the "proof" column. Accordingly, the operator may start entering items in the machine immediately and prior to the time the carriage reaches its "proof" column thereby saving the time required for the carriage to return and speeding up the operation generally.

The arm 73 must be held in the position to which it is moved because the carriage immediately leaves it and, for this purpose, there is provided a latch 191 pivoted at 192 and provided with a hooked nose 193 engaging over a stud 194 on the arm 73. The latch is urged toward latching position by a spring 195 connected between the tail of the latch and the arm 196 carrying the pivot 192. The latched position of the arm is shown in Fig. 22.

In order that the arm 73 may be released so as to be in condition for subsequent operations, a tripping pawl 197 is provided at 198 and normally held in operative position by a spring 199. At the appropriate point on the carriage a roller 200 engages this tripping pawl and moves it clockwise so as to move the latch 191 away from the stud 194 thereby releasing the lever 73.

This feature of the machine which enables speedy operation is an important and practical feature, because the operator need not stop his work to await the travel of the carriage to the proper position. The machine is conditioned immediately and the "proof" item may be entered while the carriage is getting back to the "proof" column.

*Sample of work*

A sample of the work that may be done on the machine is illustrated in Fig. 25 in which a commercial ledger form is shown. The old balance on this form is $100.00, indicating that the customer owes that amount, the system of keeping commercial accounts being opposite in some respects to that used in banking.

When the operator takes up this form the old balance of $100.00 is entered in the "pick-up" column and the machine tabulates to the "charges" column where a charge of $75.00 is entered and printed. This is added to the old balance because it indicates an additional purchase by the customer, making the total he owes $175.00. The machine then tabulates to the "credits" column where a credit of $200.00 is entered and printed indicating that the customer has paid $200.00 on his account. The machine then tabulates to the "balance" column where a total is taken, which, in this case is a credit total of $25.00, that fact being indicated by the special character CR. that is automatically printed. The carriage then automatically returns across the machine and stops in the "proof" column where it is the operator's duty to enter the old balance of $100.00 again. The old balance may be entered on the keys immediately without waiting for the carriage to reach the proof column. When the operator endeavors to enter this old balance he will be able to depress only the "1" key in the hundreds of dollars column. All the other keys will be locked so that it will be impossible for him to enter the wrong item in the "proof" column. If he endeavors to depress a key and finds it locked he will know that an error has been made. He can then look at his old balance again and check to see if he is depressing the right key. If he did not depress the right key he can then depress the right one and the machine will operate automatically without the necessity for depressing the motor bar. If, when he depresses the correct key, the motor does not operate it indicates that the subtraction lever is not in the right position and he can then move the latter to correct position after which the motor should operate. If he finds that the key corresponding to the correct amount of the old balance is undepressible, it indicates that he has entered the old balance wrongly in the "pick-up" column. If the old balance was incorrectly entered in the "pick-up" column it is now necessary to do the work over again. The machine is released by entering the old balance incorrectly, in the "proof" column, that is, entering the same amount as was entered in the "pick-up" column.

If the operator should forget to enter the old balance in the "pick-up" column, or if there is no old balance to enter, the machine cannot be operated in the "proof" column except by depression of the special key, thereby checking the fact that no balance was entered in the "pick-up" column.

It is to be understood that the example of work given is merely illustrative of the operations that may be performed and that variations may be made in the location of the columns and in the general nature of the operations that are performed.

An important feature of the invention is the time that is saved in that an operator may proceed with his work in the "proof" column before the carriage has completely returned to that column. If no error has occurred, the machine will operate automatically without requiring that the touch bar be depressed.

It is to be understood that the construction shown is for purposes of illustration only and that variations may be made in it without departing from the spirit and scope of the invention as defined by the appended claims.

I claim:

1. In combination, in a calculating machine having depressible amount keys, a proving mechanism associated with said machine and set thereby during the entry of an item in said machine, and means automatically conditioning said proving mechanism after it has been set to permit subsequent operations of the machine independent thereof, said means having provisions for automatically placing said proving mechanism in control of said amount keys prior to a predetermined subsequent operation of the machine in which said item is to be again entered to prevent depression of all of said amount keys except those that were depressed when said item was first entered.

2. In combination, in a machine of the class described, a plurality of banks of amount determining devices, a registering mechanism, a printing mechanism controllable by said registering mechanism to print amounts in the latter, a proving mechanism associated with said machine and set thereby during the entry of an item in said machine, and means automatically conditioning said proving mechanism after it has been set to enable subsequent operations of the machine involving the entry of items in said registering mechanism and the printing thereof to take place independent of said proving mechanism, said conditioning means having provisions for automatically placing said proving mechanism in control of said amount determining devices prior to a predetermined subsequent operation of the machine in which said first mentioned item is to be again entered to prevent operation of all of said devices except those that were operated when said item was first entered.

3. In combination, in a calculating machine having depressible amount keys, a proving mechanism set by depression of said keys in the entry of an item thereon, and means automatically rendering said proving mechanism inactive after it has been set to permit subsequent depression of said keys independent of said proving mechanism, said means having provisions for automatically rendering said proving mechanism active for a predetermined subsequent operation of the machine in which the same item is to be entered on the amount keys a second time, said proving mechanism having portions operating, when said proving mechanism is thus rendered active, to prevent depression of all of said amount keys except the keys that were depressed at the time said item was first entered.

4. In combination, in a calculating machine having depressible amount keys, a proving mechanism positioned in operative relation to said keys so as to be set by depression of said keys in the entry of an item thereon, and means for moving said proving mechanism out of operative relation with said keys to permit them to be subsequently operated independent of said proving mechanism, said means having provisions for automatically moving said proving mechanism into operative relation with said keys for a predetermined subsequent operation of the machine in which said item is to be entered a second time, said proving mechanism having portions operating, when thus moved to operative relation with said keys, to prevent depression of all of the amount keys except those that were depressed when said item was first entered.

5. A calculating machine having operating means, depressible amount keys, proving mechanism set by depression of said amount keys in entering an item thereon, and means controlled from said operating means acting to automatically condition said proving mechanism after a predetermined number of operations of the machine to prevent depression of any of said amount keys except those that were depressed when said item was entered thereon.

6. In combination, in a calculating machine having an operating means and depressible amount keys, a proving mechanism urged to a postion where it is operatively associated with said amount keys so as to be set by depression of said amount keys in entering an item thereon, connections actuated by said operating means as the machine is operated for moving said set proving mechanism out of operative relation with said amount keys, a latching device holding said proving mechanism in its moved position, and means automatically releasing said latching device after a predetermined number of operations of the machine to permit the proving mechanism to return to operative relation with said amount keys, said proving mechanism having portions acting, when it is so returned, to prevent depression of all of said amount keys except those that were depressed when said item was first entered.

7. In combination, in a calculating machine having banks of depressible amount keys, a detent for each key adapted to be set by depression of its key in entering an item on said keys, a slide for each bank connected to the detents of its bank to move them out of operative relation with the amount keys, a second slide adjacent each bank associated with the detents of its bank so that the setting of any one of its detents moves said second slide, means for moving said first slides after said detents have been set to move the detents out of operative relation with the amount keys, latching devices for holding all of said slides in their moved positions, and means for conditioning said latching devices to permit the first slides to return their detents into operative relation with said keys while holding said second slides in their moved positions whereby said second slides block movement of said detents and prevent depression of all of the keys except those whose detents were set when the keys were depressed in entering said item, said second slides being releasable by depression of said keys that were first depressed.

8. A calculating machine having depressible amount keys, a traveling paper carriage, proving mechanism set during the entry of an item in said machine with the carriage in a predetermined columnar position, and carriage controlled connections for automatically placing said proving mechanism in control of said amount keys in a predetermined subsequent columnar position of the carriage where said item is to be entered a second time, said proving mechanism having portions preventing depression of all of said amount keys except those depressed when said item was first entered.

9. A calculating machine having depressible amount keys, a traveling paper carriage, and proving mechanism controlled by said paper carriage and set by depression of said amount keys in entering an item thereon in one columnar position of the carriage, said proving mechanism acting automatically to prevent depression of all of said amount keys in a subsequent predetermined position of the carriage except those depressed in the first columnar position of said carriage.

10. In combination, in a machine of the class described, a plurality of banks of amount determining devices, a traveling paper carriage, a registering mechanism, a printing mechanism operable to print under the control of said registering mechanism, a proving mechanism associated with said machine and set under the control of said amount determining devices during the entry of an item in said machine, and means automatically conditioning said proving mechanism after it has been set to enable subsequent operations of the machine involving operation of said amount determining devices and the entry of items in said registering mechanism and the printing thereof to take place independent of said proving mechanism, said conditioning means having portions controlled by said paper carriage for automatically placing said proving mechanism in control of said amount determining devices prior to operation of the machine in a predetermined subsequent columnar position of said carriage in which said item is to be again entered to thereby prevent operation of all of said amount determining devices except those that were operated when said item was first entered.

11. In a calculating machine having depressible amount keys and a traveling paper carriage, a proving mechanism set by depression of said keys in entering an item thereon in a predetermined columnar position of the carriage, means controlled by said carriage acting automatically to render said proving mechanism inactive to permit subsequent manipulation of said keys independent of said proving mechanism, connections controlled by the carriage acting automatically to render said proving mechanism active in a subsequent predetermined position of said carriage, said proving mechanism having portions acting, when said mechanism is thus rendered active, to prevent depression of all of the amount keys except those that were depressed when said item was first entered.

12. In combination, in a calculating machine having an operating means, depressible amount keys, and a traveling paper carriage; a proving mechanism urged into operative relation with said amount keys and set by depression of said keys in the entry of an item thereon, means actuated by said operating means for moving said proving mechanism out of operative relation with said keys after it has been set, a latching device for holding said proving mechanism in its moved position, and means controlled by said carriage for releasing the latching device as the carriage moves to a predetermined position to thereby permit said proving mechanism to return into operative relation with the amount keys, said proving mechanism having portions acting, when it is returned, to prevent depression of all of the amount keys except those that were depressed when said item was first entered.

13. In combination, in a calculating machine having an operating means, depressible amount keys, and a traveling paper carriage; a proving mechanism urged toward operative relation with said amount keys and set by depression of said keys in the entry of an item thereon in a predetermined columnar position of said carriage, means conditioned by said paper carriage and actuated by movement of said operating means for moving said set proving mechanism out of operative relation with said amount keys as the machine is operated after the keys have been depressed to enter said item, a latching device for holding said proving mechanism in its moved position, and connections controlled by the carriage for automatically releasing said latching device in a predetermined subsequent position of the carriage to permit said set proving mechanism to return into operative relation with said amount keys, said proving mechanism having portions acting, upon its return, to prevent depression of all of said amount keys except those that were depressed when said item was first entered.

14. In combination, in a calculating machine having a traveling paper carriage and banks of depressible amount keys, a detent for each key adapted to be set by depression of said key upon entering an item in said machine, a slide adjacent each bank connected to the detents of its bank to move them into and out of operative relation with said keys, said slides being urged to a position to place said detents in operative relation to said keys, a second slide for each bank associated with the detents of said bank to be moved when any of the detents of its bank are set, means controlled by said paper carriage for moving both sets of slides to move said detents out of operative relation with said keys after an item has been entered thereon, latching devices for holding both sets of said slides in moved position, and connections controlled by said paper carriage for automatically conditioning said latching devices in a predetermined position of the carriage to permit said first slides to move to return their detents into operative relation with the amount keys while detaining said second slides in their moved positions whereby said second slides prevent movement of said detents to prevent depression of the amount keys that were not depressed when said item was first entered thereon, said second slides being released by depression of said amount keys that were first depressed.

15. In combination, in a calculating machine having an operating means, a traveling paper carriage, and banks of depressible amount keys; a detent for each key adapted to be set by depression of the key when an item is entered on said keys, a slide adjacent each bank connected to the detents of its bank to move them into and out of operative relation with said keys, said slides being urged in a direction to position the detents in operative relation with said keys, a second slide for each bank associated with the detents of its bank so as to be moved when a detent of its bank is set, a latching device conditioned by movement of said operating means for preventing said second slides from returning to their normal positions, means controlled by said paper carriage for moving said first slides to move said detents out of operative relation with said amount keys, a latching device for holding said first slides in their moved position, and connections controlled by said carriage for releasing both of said latching devices whereby said first slides are released to move their detents into operative relation with said amount keys, said latching device for said second slides being blocked by said second slides and said second slides preventing movement of unset detents to prevent depression of any of the amount keys except those that were first depressed, said second slides being moved by depression of the amount keys that were first depressed to release the blocked latching device for said second slides.

16. In combination, in a calculating machine having amount keys adapted to be depressed in entering an item in the machine, a proving mechanism, and means automatically conditioning said proving mechanism in a predetermined operation of the machine to prevent depression of any of said amount keys in a predetermined subsequent operation of the machine when none of said amount keys were depressed in said first predetermined operation thereof, said means having provisions for allowing the depression of said amount keys for operations of the machine between said first and second predetermined operations.

17. In combination, in a calculating machine having amount keys, a proving mechanism operatively associated with said keys and adapted to be set by depression of the same in entering an item thereon in a predetermined operation of the machine, means for automatically rendering said proving mechanism inactive after said predetermined operation of the machine to permit subsequent operations independent of said proving mechanism, said means having provisions for again rendering said proving mechanism active for a predetermined subsequent operation of the machine where said keys are to be manipulated the same as during said first predetermined operation of the machine, and means for conditioning said proving mechanism to prevent depression of all the amount keys at the time of said subsequent operation if none of said keys were depressed at the time of said first predetermined operation of the machine.

18. In combination, in a calculating machine having amount keys and a traveling paper carriage, a proving mechanism operatively associated with said amount keys and adapted to be set by depression of the same in entering an item thereon in a predetermined columnar position of the carriage, and means controlled by said paper carriage for automatically rendering said proving mechanism inactive to permit subsequent operation of the machine independent of said proving mechanism, said carriage controlled means having provisions for rendering said proving mechanism active in a predetermined subsequent position of the carriage, and said proving mechanism having portions acting in said subsequent position of the carriage to lock all of said amount keys against depression when no keys were depressed in said first columnar position of the carriage.

19. In combination, in a calculating machine having depressible amount keys, a proving mechanism, means for conditioning said proving mechanism to prevent depression of all of said amount keys at a predetermined operation of said machine when none of said keys were depressed at a prior predetermined operation of the machine, and means for disabling said conditioning means by depression of any of said amount keys during said prior predetermined operation of the machine.

20. In combination, in a calculating machine having depressible amount keys and a traveling paper carriage, a proving mechanism controlled by said paper carriage, means for conditioning said proving mechanism to lock all of the amount keys against depression in a predetermined columnar position of the carriage when none of said amount keys were depressed in a prior predetermined columnar position of the carriage, and means for disabling said conditioning means by depression of any one of said amount keys in said prior predetermined columnar position of the carriage.

21. A calculating machine having depressible amount keys, a proving mechanism for controlling operation of the machine, means for automatically conditioning said proving mechanism at a predetermined operation of the machine in which no amount keys are depressed, means for automatically rendering said proving mechanism inactive after it has been conditioned to thereby permit subsequent operations of the machine independently of said proving mechanism, said last named means having provisions for causing it to again render said proving mechanism active for a subsequent operation of the machine in which no amount keys are to be depressed to thereby prevent said subsequent operation, and means for releasing said proving mechanism at will to permit said subsequent operation of the machine.

22. In a calculating machine having depressible amount keys and a traveling paper carriage, a proving mechanism for controlling operation of the machine, means for automatically setting said mechanism at a predetermined operation of the machine in which no amount keys are depressed, means controlled by the carriage for automatically rendering said proving mechanism inactive to permit subsequent operations of the machine independent of said mechanism, said means including provisions for causing it to render said proving mechanism active in a subsequent predetermined position of the carriage in which no amount keys are to be depressed to thereby prevent operation of said machine, and means for releasing said proving mechanism at will to permit operation of the machine.

23. In a motor-driven calculating machine having depressible amount keys and a controlling mechanism for causing the motor to operate the machine, a proving mechanism, means automatically conditioning said proving mechanism at a predetermined operation of the machine in which no amount keys are depressed to cause it to disable said controlling mechanism for a predetermined subsequent operation of the machine in which no amount keys are to be depressed, and means for releasing said proving mechanism at will to enable said controlling mechanism.

24. In a motor-driven calculating machine having depressible amount keys, a traveling paper carriage, and a controlling mechanism for causing the motor to operate the machine; proving mechanism controlled by the paper carriage, means for automatically setting said proving mechanism in a predetermined columnar position of the carriage in which no amount keys are depressed to condition it to subsequently disable said controlling mechanism, connections controlled by the carriage for automatically rendering said proving mechanism inactive after it has been set, said connections having provisions for again rendering said proving mechanism active in a subsequent position of the carriage in which no amount keys are to be depressed to thereby disable said controlling mechanism, and means for releasing said proving mechanism at will to enable said controlling mechanism.

25. In combination, in a motor-driven calculating machine having depressible amount keys, a traveling paper carriage, and a controlling mechanism for causing the motor to operate the machine; a proving mechanism adapted to be controlled by said amount keys in a predetermined columnar position of the carriage and adapted to control said controlling mechanism, means controlled by said carriage for automatically conditioning said proving mechanism to permit subsequent operations of the machine independent of said proving mechanism, a latching device for holding said proving mechanism in condition to disable said controlling means in a predetermined subsequent columnar position of the carriage when no amount keys were depressed in the first columnar position thereof, means for releasing said latching device, and connections operated by depression of any of the amount keys in said prior columnar position of the carriage for disabling said latching device.

26. A calculating machine having a motor operated driving mechanism, amount keys depressible to enter items in said machine, means for automatically placing said driving mechanism under control of said amount keys prior to an operation of the machine in which said keys are to be depressed, and means controlled by said keys in the entry of an item for causing said driving mechanism to automatically operate the machine when the last of the proper series of said amount keys is depressed in the entry of said items.

27. A motor driven calculating machine having a manually operable controlling mechanism for causing the motor to operate the machine, amount keys depressible to enter items in said machine, means for automatically placing said controlling mechanism under control of said amount keys prior to an operation of the machine in which the keys are to be depressed, and means controlled by said keys in the entry of an item for causing said controlling mechanism to automatically cause an operation of the machine when the last of the proper series of said amount keys is depressed in the entry of said item.

28. A motor-driven calculating machine having a controlling mechanism for causing the motor to operate the machine, depressible amount keys, means for automatically conditioning the controlling mechanism for movement to position to operate the machine, restraining means for preventing such movement of said mechanism, and means controlled by depression of a predetermined series of said amount keys in the entry of an item for releasing said restraining means to permit the controlling mechanism to cause the motor to operate the machine.

29. A calculating machine having a motor-operated driving mechanism, a totaling means, depressible amount keys, means controlled by said totaling means for conditioning said driving mechanism for operation of the machine, restraining means for preventing said driving mechanism from operating the machine when so conditioned, and means controlled by depression of a predetermined series of said amount keys in the entry of an item for releasing said restraining means to permit the driving mechanism to automatically operate the machine upon depression of the last of said predetermined amount keys.

30. A calculating machine having a motor operated driving mechanism, amount keys adapted to be depressed by the entry of an item thereon prior to an operation of the machine, proving mechanism set by the entry of said item and acting to prevent a predetermined subsequent operation of the machine unless the same amount keys are depressed for said subsequent operation as were depressed prior to said first operation, and means acting automatically to cause said driving mechanism to give said machine said subsequent operation when the last of said amount keys is depressed that must be depressed in entering said item the second time.

31. In a calculating machine having depressible amount keys, a proving mechanism for receiving an item that is entered in the machine during an operation thereof, means for automatically rendering said proving mechanism inactive for a predetermined period and for subsequently rendering it active, said proving mechanism having provisions which act when said mechanism is returned to active condition to prevent depression of any of the amount keys except the keys that were depressed when said item was first entered, and means controlled by said amount keys for automatically giving the machine a stroke of operation when the last key of the keys that can be depressed is depressed.

32. A motor driven calculating machine having depressible amount keys, a manually operable controlling mechanism for causing the motor to operate the machine, a proving mechanism for receiving an item that is entered in the machine, means for automatically rendering said proving mechanism inactive for a predetermined subsequent number of operations of the machine and for then rendering it active prior to a subsequent operation of the machine where it is desired to again enter said item, said proving mechanism having provisions for then preventing depression of any of the amount keys except those that were depressed when the item was first entered, and means for automatically disabling the manual control of the controlling mechanism and placing said mechanism under the control of the proving mechanism in said subsequent operation, said proving mechanism having portions preventing said controlling mechanism from operating the machine unless the same amount keys are depressed as were depressed when said item was first entered, said controlling mechanism acting to automatically cause an operation of the machine when the last of said amount keys has been depressed in entering the item the second time.

33. A calculating machine having depressible amount keys, a motor operated driving mechanism, a traveling paper carriage, means controlled by the carriage and set by the amount keys in entering an item thereon in a predetermined columnar position of said carriage acting to automatically cause the driving mechanism to give the machine a stroke of operation when the last of the same keys is depressed in a subsequent predetermined columnar position of the carriage.

34. A calculating machine having depressible amount keys, a motor operated driving mechanism, a traveling paper carriage, means controlled by the paper carriage and set by the amount keys when an item is entered on them in a predetermined columnar position of the carriage for automatically preventing, in a subsequent predetermined columnar position of the carriage, the depression of all of the amount keys except those which were depressed in the first columnar position of the carriage, and means controlled by said keys for causing the driving mechanism to automatically operate the machine when the last of said keys is depressed in entering said item in said subsequent columnar position of the carriage.

35. A motor driven calculating machine having depressible amount keys, a totalizing means, a traveling paper carriage, a controlling mechanism for causing the motor to operate the machine, a proving mechanism associated with the amount keys and set by depression of them when an item is entered thereon, means controlled by the carriage for automatically rendering the proving mechanism inactive for a subsequent number of operations of the machine and for again rendering it active for control by said keys in a predetermined subsequent columnar position of the carriage, and means controlled by said totaling means for conditioning the controlling mechanism for control by said proving mechanism in said subsequent position of the carriage, said proving mechanism having portions operatively associated with said controlling mechanism for causing the controlling mechanism to give the machine a stroke of operation when the last of the proper amount keys is depressed in entering said item in the machine in said subsequent position of the carriage.

36. In combination, in a motor-driven calculating machine having depressible amount keys, a traveling paper carriage, and a controlling mechanism for causing the motor to operate the machine; a proving mechanism set by depression of said amount keys upon entry of an item thereon in a predetermined columnar position of the carriage, means controlled by the carriage for automatically moving said proving mechanism to inactive position to permit subsequent operations of the machine independent of said proving mechanism, and connections operable to condition said controlling mechanism for automatic movement to position to cause said machine to be operated, said connections placing said controlling mechanism under the control of said proving mechanism, said carriage controlled means having provisions for moving said proving mechanism to active position in a predetermined subsequent position of the carriage in which said item is to be again entered to prevent depression of all of said amount keys except those that were depressed when the said item was first entered, said proving mechanism having provisions for preventing movement of said controlling mechanism until all of the same keys have been depressed in the second entry of said item as were depressed upon the first entry thereof, said controlling mechanism automatically causing an operation of the machine when said keys have been depressed.

37. A calculating machine having a traveling paper carriage, amount keys adapted to be depressed to enter an item in said machine in a predetermined columnar position of the carriage, a proving mechanism for preventing operation of the machine under certain conditions in a subsequent predetermined columnar position of the carriage, and means acting to automatically condition said proving mechanism prior to the time said carriage reaches its subsequent predetermined columnar position and after it leaves its preceding columnar position to cause said proving mechanism to prevent operating of the machine unless the same amount keys are depressed in entering said item as were depressed when it was first entered.

38. A calculating machine having a traveling paper carriage, means for automatically returning said carriage across the machine after it has reached the limit of its travel in one direction, amount keys adapted to be depressed to enter an item in said machine in a predetermined columnar position of the carriage, a proving mechanism acting to prevent operation of the machine in a subsequent predetermined columnar position of the carriage unless the same amount keys are depressed in said subsequent columnar position as were depressed when said item was first entered, said carriage being moved to said subsequent columnar position by being returned across the machine from a prior preceding column, and means for conditioning said proving mechanism for effective operation prior to the return of the carriage across the machine and immediately after said carriage leaves its preceding columnar position.

39. A calculating machine having a traveling paper carriage, amount keys adapted to be depressed to enter an item in said machine in a predetermined columnar position of the carriage, a proving mechanism acting, in a subsequent predetermined columnar position of the carriage where said item is to be again entered on said amount keys, to prevent depression of all of said keys except those that were depressed when said item was first entered, and means for conditioning said proving mechanism to prevent depression of said keys prior to the arrival of said carriage at said subsequent predetermined columnar position and after said carriage has left its preceding columnar position.

40. A calculating machine having a traveling paper carriage, means for automatically returning said carriage across the machine after it has reached the limit of its travel in one direction, amount keys adapted to be depressed to enter an item in said machine in a predetermined columnar position of the carriage, a proving mechanism acting, in a subsequent predetermined columnar position of the carriage where said item is to be again entered, to prevent depression of all of the amount keys except those that were depressed when said item was first entered, said carriage arriving at said subsequent columnar position of the carriage by returning across the machine, and means for automatically conditioning said proving mechanism to prevent depression of said keys prior to the return of said carriage across the machine and immediately after the carriage has left its preceding columnar position.

41. A calculating machine having depressible amount keys for receiving items to be entered in the machine, means for conditioning the machine for addition or subtraction, a proving mechanism controlled by said conditioning means and set in addition condition when said conditioning means is in addition condition for the entry of an item in a predetermined operation of the machine, said conditioning means being free for subsequent operation and connections for automatically locking said proving mechanism in addition condition for a predetermined subsequent operation of the machine in which said item is to be again entered in the machine to thereby lock said conditioning means in addition condition.

42. In combination, in a calculating machine having depressible amount keys, a traveling paper carriage, and a subtraction lever and connections for conditioning the machine for addition or subtraction, said subtraction lever being urged to addition position; a proving mechanism controlled by said subtraction lever and normally set in addition condition when the subtraction lever is in addition position in a predetermined columnar position of the carriage where an item is to be entered in the machine, said subtraction lever being free for subsequent operation, and connections conditioned automatically by the carriage in a predetermined subsequent columnar position of the carriage where said item is to be again entered for locking said proving mechanism to lock said subtraction lever in addition position.

43. In combination, in a calculating machine having depressible amount keys, a motor operated driving mechanism, and a subtraction lever and connections for conditioning the machine for addition or subtraction; a proving mechanism set by movement of said subtraction lever to subtraction position in a predetermined operation of the machine in which an item is entered therein, said subtraction lever being free to be subsequently operated without changing the setting of the proving mechanism, means automatically placing said driving mechanism under the control of said proving mechanism for a predetermined subsequent operation of the machine in which said item is to be again entered to prevent operation of said machine unless said subtraction lever is in subtraction position, said driving mechanism having provisions for automatically operating the machine when said subtraction lever is moved to subtraction position.

44. In combination, in a motor driven calculating machine having depressible amount keys, a traveling paper carriage, a subtraction lever and connections for conditioning the machine for addition or subtraction, and a controlling mechanism for causing the motor to operate the machine; a proving mechanism set by movement of the subtraction lever to subtraction position in a predetermined columnar position of the carriage in which an item is entered in the machine negatively, said subtraction lever being free for subsequent operation without changing the setting of the proving mechanism, and connections controlled by said carriage for automatically conditioning said controlling mechanism for movement to condition to cause an operation of the machine and for placing said controlling mechanism under the restraining control of said proving mechanism, said proving mechanism releasing said controlling mechanism to permit it to automatically cause an operation of the machine when said subtraction lever is moved to subtraction position.

45. A calculating machine having a motor operated driving mechanism, a controlling means therefor, amount keys depressible to enter items in said machine, a proving mechanism controlled by said amount keys, and means acting automatically during a predetermined operation of the machine to place said controlling mechanism under control of said proving mechanism to cause said driving mechanism to be automatically operated when the proper series of amount keys is depressed in the entry of an item for the next operation of the machine.

46. A calculating machine having a motor operated driving mechanism, a controlling means therefor, amount keys depressible to enter items in said machine, a total taking means, a proving mechanism controlled by said amount keys, and connections controlled by said total taking means for placing said controlling means under control of said proving mechanism when a total is taken to cause the driving mechanism to be automatically operated when the last of the proper amount keys are depressed in the entry of an item for the next operation of the machine.

47. A calculation machine having a motor operated driving mechanism, amount keys depressible to enter items in said machine, a proving mechanism, means acting automatically to condition said proving mechanism in a predetermined operation of the machine to prevent depression of any of said amount keys in a predetermined subsequent operation of the machine when no amount keys were depressed in said first predetermined operation, means for releasing said keys, and connections operated by said releasing means for causing said driving mechanism to automatically give the machine a stroke of operation when said keys are released.

48. In combination, a calculating machine having depressible amount keys, a proving mechanism adapted to be set during the entry of an item in said machine at a predetermined operation thereof, means acting to automatically condition said proving mechanism to permit subsequent operations of the machine independently of said proving mechanism, said means having provisions for automatically placing said proving mechanism in control of said amount keys for a predetermined subsequent operation of the machine, said proving mechanism tending to move to a position to release all of said amount keys when no amount keys were depressed in said first predetermined machine operation, special means acting automatically when no keys were depressed during said first machine operation to cause said proving mechanism to lock all of the amount keys against depression for said second machine operation, and connections acting to automatically disable said special means when an amount key is depressed for said first machine operation, said special means having manually manipulatable portions for releasing said proving mechanism.

In testimony whereof, I have subscribed my name,

ROBERT L. MULLER.